(12) United States Patent
Yoshino et al.

(10) Patent No.: US 11,293,644 B2
(45) Date of Patent: Apr. 5, 2022

(54) HEATING COOKER SYSTEM, AND COOKING DEVICE

(71) Applicants: Mitsubishi Electric Corporation, Tokyo (JP); Mitsubishi Electric Home Appliance Co., Ltd., Fukaya (JP)

(72) Inventors: Hayato Yoshino, Tokyo (JP); Jun Bunya, Tokyo (JP); Ikuro Suga, Tokyo (JP)

(73) Assignees: Mitsubishi Electric Corporation, Tokyo (JP); Mitsubishi Electric Home Appliance Co., Ltd., Fukaya (JP)

( * ) Notice: Subject to any disclaimer, the term of this patent is extended or adjusted under 35 U.S.C. 154(b) by 219 days.

(21) Appl. No.: 16/073,433

(22) PCT Filed: Apr. 6, 2016

(86) PCT No.: PCT/JP2016/061201
§ 371 (c)(1),
(2) Date: Jul. 27, 2018

(87) PCT Pub. No.: WO2017/175321
PCT Pub. Date: Oct. 12, 2017

(65) Prior Publication Data
US 2019/0032922 A1    Jan. 31, 2019

(51) Int. Cl.
*F24C 7/08* (2006.01)
*F24C 7/02* (2006.01)
(Continued)

(52) U.S. Cl.
CPC .............. *F24C 7/088* (2013.01); *F24C 7/02* (2013.01); *H02J 50/12* (2016.02); *H02J 50/80* (2016.02);
(Continued)

(58) Field of Classification Search
CPC ........ F24C 7/088; F24C 15/10; H05B 6/1236; H05B 6/062; H05B 2213/06;
(Continued)

(56) References Cited

U.S. PATENT DOCUMENTS

| | | | | |
|---|---|---|---|---|
| 2,415,688 A | * | 2/1947 | Hall, Jr. ................ | H01F 38/14 219/246 |
| 3,742,175 A | * | 6/1973 | Hamden, Jr. .......... | H05B 6/062 219/627 |

(Continued)

FOREIGN PATENT DOCUMENTS

| | | | |
|---|---|---|---|
| CN | 106813276 B | * | 4/2020 |
| JP | S52-096438 A | | 8/1977 |

(Continued)

OTHER PUBLICATIONS

International Search Report of the International Searching Authority dated Jul. 5, 2016 for the corresponding international application No. PCT/JP2016/061201 (and English translation).

(Continued)

*Primary Examiner* — Tu B Hoang
*Assistant Examiner* — Vy T Nguyen
(74) *Attorney, Agent, or Firm* — Posz Law Group, PLC

(57) ABSTRACT

A heating cooker system according to the present invention includes: an induction cooker including a first coil configured to produce a first high-frequency magnetic field for induction heating, a first inverter circuit configured to supply a first high-frequency current to the first coil, a second coil configured to produce a second high-frequency magnetic field, and a second inverter circuit provided independently of the first inverter circuit and configured to supply a second high-frequency current to the second coil; and a cooking device including a power receiving coil configured to wirelessly receive supply of electric power from the second (Continued)

high-frequency magnetic field when the power receiving coil is positioned in the second high-frequency magnetic field, and a cooking unit configured to be driven by the electric power received by the power receiving coil.

12 Claims, 12 Drawing Sheets

(51) Int. Cl.
*H02J 50/80* (2016.01)
*H02J 50/12* (2016.01)
*H05B 6/06* (2006.01)
*H05B 6/12* (2006.01)

(52) U.S. Cl.
CPC .......... *H05B 6/065* (2013.01); *H05B 6/1236* (2013.01); *H05B 6/1245* (2013.01); *H05B 2213/06* (2013.01)

(58) Field of Classification Search
CPC .......... H05B 2206/022; H05B 2213/07; H05B 6/04; H05B 6/08; H05B 6/12; H05B 6/1209; H05B 6/1227; H05B 6/1245; H05B 6/1254; Y02B 40/123; Y02B 40/126; H02J 50/00; H02J 50/10; H02J 50/40; H02J 50/70; H02J 5/005; H02J 50/50; H02J 50/80; H02J 50/90; H02J 7/00045; H02J 7/025; A47J 27/004; A47J 27/14; A47J 36/321; A47J 43/044; A47B 2200/0009; A47F 10/02; B01F 11/0085; B01F 11/04; B01F 15/00707; B01F 7/00408; B01F 7/00941; F24B 7/00; G01F 23/20; G01F 23/24; G01F 23/244; G01F 23/26; G01G 19/4144; G01G 7/00; G01R 31/40; G06F 3/147; G06K 19/0672; G06K 19/0717; G06K 19/0723; G06K 7/0008; G06K 7/086; G08B 13/2437; G09G 2370/16; G09G 2380/04; H01F 21/02; H01F 38/14; H04B 5/0037; Y10S 99/14; Y10T 29/49002
USPC ....... 219/412, 621, 622, 624, 660, 627, 652, 219/667, 218, 385, 386, 446.1, 448.11, 219/618, 620, 623, 647, 662, 663, 726; 99/DIG. 14, 451; 126/220, 221; 235/375, 385, 487, 492; 307/104, 149; 363/21.04; 366/221, 333
See application file for complete search history.

(56) References Cited

U.S. PATENT DOCUMENTS

| | | | | |
|---|---|---|---|---|
| 3,761,668 A | * | 9/1973 | Hamden, Jr. | H05B 6/062 |
| | | | | 219/622 |
| 4,617,441 A | * | 10/1986 | Koide | G01K 1/024 |
| | | | | 219/627 |
| 5,070,222 A | * | 12/1991 | Yahav | H05B 6/1227 |
| | | | | 219/621 |
| 5,412,171 A | * | 5/1995 | Yahav | F24B 7/00 |
| | | | | 219/621 |
| 8,618,695 B2 | * | 12/2013 | Azancot | H02J 50/10 |
| | | | | 307/104 |
| 9,247,588 B2 | * | 1/2016 | Baarman | H02J 50/10 |
| 2002/0008632 A1 | | 1/2002 | Clothier | |
| 2010/0219183 A1 | * | 9/2010 | Azancot | H02J 50/005 |
| | | | | 219/676 |
| 2011/0121660 A1 | * | 5/2011 | Azancot | H02J 50/10 |
| | | | | 307/104 |
| 2015/0250027 A1 | * | 9/2015 | Takano | H05B 6/062 |
| | | | | 219/664 |
| 2016/0233711 A1 | * | 8/2016 | Miller | H02J 7/0047 |
| 2017/0353054 A1 | * | 12/2017 | Lee | H02J 50/40 |
| 2018/0351369 A1 | * | 12/2018 | Lee | H02J 50/80 |

FOREIGN PATENT DOCUMENTS

| | | | | |
|---|---|---|---|---|
| JP | S60-248923 A | | 12/1985 | |
| JP | 4-341790 A | | 11/1992 | |
| JP | 05-010529 A | | 1/1993 | |
| JP | 7-263132 A | | 10/1995 | |
| JP | 2874506 B2 | | 1/1999 | |
| JP | 2003-529184 A | | 9/2003 | |
| JP | 2011-033313 A | | 2/2011 | |
| JP | 4922136 B2 | * | 4/2012 | |
| JP | 2012-113975 A | | 6/2012 | |
| JP | 2012-234758 A | | 11/2012 | |
| JP | 5104798 B2 | * | 12/2012 | |
| JP | 2013-062173 A | | 4/2013 | |
| JP | 2014-154533 A | | 8/2014 | |
| JP | 2015-204213 A | | 11/2015 | |
| JP | 2016-007247 A | | 1/2016 | |
| WO | 2014/075923 A1 | | 5/2014 | |
| WO | WO-2014069010 A1 | * | 5/2014 | ............... H05B 6/62 |

OTHER PUBLICATIONS

Examination Report dated May 7, 2020 issued in corresponding GB patent application No. 1812248.1.

* cited by examiner

HEATING COOKER SYSTEM, AND COOKING DEVICE

CROSS REFERENCE TO RELATED APPLICATION

This application is a U.S. national stage application of PCT/JP2016/061201 filed on Apr. 6, 2016, the contents of which are incorporated herein by reference.

The present invention relates to a heating cooker system, an induction cooker, and a cooking device using induction heating and heating through wireless power transmission.

BACKGROUND ART

Conventionally, a high-frequency induction cooker has been proposed which includes an induction coil that inductively heats a cooking container, a power receiving coil that is electromagnetically induced by a power supply coil, and a heating unit that is supplied with power by the power receiving coil, and in which the induction coil and the power supply coil share a power supply unit (see Patent Literature 1, for example).

CITATION LIST

Patent Literature

Patent Literature 1: Japanese Unexamined Patent Application Publication No. 4-341790

SUMMARY OF INVENTION

Technical Problem

The past high-frequency induction cooker uses the same power supply unit to supply power to the heating coil and the power supply coil. That is, the past high-frequency induction cooker alternately switches between supply of power to the induction coil from the power supply unit and supply of power to the power supply coil from the power supply unit with a coil switching relay. This raises an issue that induction heating with the induction coil and cooking with electric power received from the power supply coil through wireless power transmission are not simultaneously executable.

Further, in the past high-frequency induction cooker, the induction coil and the power supply coil are connected in series to supply power to the induction coil and the power supply coil from the single power supply unit. This raises an issue that the induction heating with the induction coil and the cooking with the electric power received through wireless power transmission cannot be independently controlled.

The present invention has been made to address the above-described issues, and obtains a heating cooker system, an induction cooker, and a cooking device capable of simultaneously and independently controlling heating through induction and cooking through wireless power transmission.

Solution to Problem

A heating cooker system according to an embodiment of the present invention includes: an induction cooker including a first coil configured to produce a first high-frequency magnetic field for induction heating, a first inverter circuit configured to supply a first high-frequency current to the first coil, a second coil configured to produce a second high-frequency magnetic field, and a second inverter circuit provided independently of the first inverter circuit and configured to supply a second high-frequency current to the second coil; and a cooking device including a power receiving coil configured to wirelessly receive supply of electric power from the second high-frequency magnetic field when the power receiving coil is positioned in the second high-frequency magnetic field, and a cooking unit configured to be driven by the electric power received by the power receiving coil.

Advantageous Effects of Invention

The heating cooker system according to the embodiment of the present invention includes the first inverter circuit, which supplies the first high-frequency current to the first coil that inductively heats a heating target, and the second inverter circuit, which supplies the second high-frequency current to the second coil that transmits electric power to the power receiving coil.

Accordingly, the heating through induction and the cooking through wireless power transmission are simultaneously executable. Further, the heating through induction and the cooking through wireless power transmission are independently controllable.

DESCRIPTION OF EMBODIMENTS

Embodiment 1

(Configuration)

Figure 1:
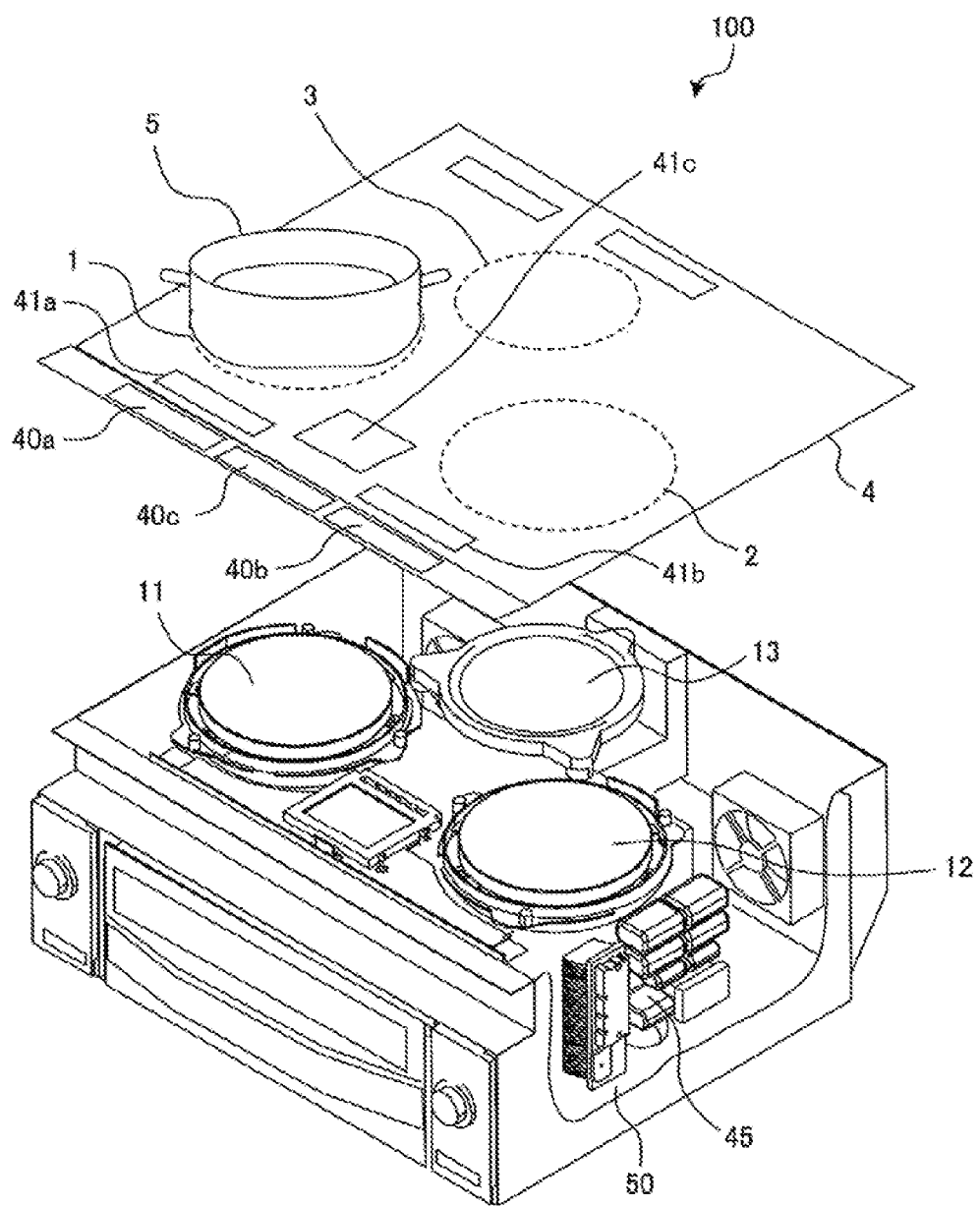
FIG. 1 is an exploded perspective view illustrating an induction cooker of a heating cooker system according to Embodiment 1.

FIG. 1 is an exploded perspective view illustrating an induction cooker of a heating cooker system according to Embodiment 1.

As illustrated in FIG. 1, an upper part of an induction cooker 100 includes a top plate 4 on which a load, such as a heating target 5 like a pot or a cooking device 200, is placed. With FIG. 1, a description will be given of an example in which the heating target 5 is placed as the load. The top plate 4 includes a first heating area 1, a second heating area 2, and a third heating area 3 as heating areas for inductively heating the heating target 5, and a first heating unit 11, a second heating unit 12, and a third heating unit 13 corresponding to the respective heating areas are provided to inductively heat the heating target 5 placed on one of the heating areas.

In Embodiment 1, the first heating unit 11 and the second heating unit 12 are provided as laterally aligned near the front side of a main body, and the third heating unit 13 is provided substantially at the center of the main body near the rear side of the main body.

The arrangement of the heating areas is not limited thereto. For example, the three heating areas may be arranged as laterally aligned substantially linearly.

Further, the first heating unit 11 and the second heating unit 12 may be arranged such that the respective centers thereof are different in position in the anteroposterior direction.

The whole of top plate 4 is made of an infrared transmitting material, such as heat-resistant reinforced glass or crystallized glass, and is watertightly fixed to an outer circumference of an upper opening of the induction cooker 100 via a rubber packing or sealing material. Circular pot position marks representing general pot placement positions corresponding to heating ranges (the heating areas) of the first heating unit 11, the second heating unit 12, and the third heating unit 13 are formed on the top plate 4 by painting or printing, for example.

An operation unit 40a, an operation unit 40b, and an operation unit 40c (hereinafter occasionally collectively referred to as the operation units 40) are provided near the front side of the top plate 4 as input devices each for setting heating power to be input (electric power to be input) and a cooking menu (such as boiling mode, frying mode, or cooking device cooking mode) when heating the heating target 5 with the corresponding one of the first heating unit 11, the second heating unit 12, and the third heating unit 13. Further, a display unit 41a, a display unit 41b, and a display unit 41c for displaying information such as the operating state of the induction cooker 100 and the information of inputs and operations sent from the operation units 40 are provided near the operation units 40 as reporting units.

The configurations of the operation units 40a to 40c and the display units 41a to 41c are not particularly limited. For example, the operation units 40a to 40c and the display units 41a to 41c may be provided for the respective heating areas, or an operation unit 40 and a display unit 41 may be provided for the heating areas as a whole. The operation units 40a to 40c are formed as mechanical switches, such as push switches or tactile switches, or touch switches that detect an input operation based on a change in the capacitance of an electrode, for example. Further, the display units 41a to 41c are formed as liquid crystal devices (LCDs) or LEDs, for example.

The following description will be given of a case in which a display and operation unit 43 configured to integrate the operation units 40 and the display units 41 is provided. The display and operation unit 43 is formed as a touch panel having touch switches arranged on an upper surface of an LCD, for example.

Under the top plate 4, the induction cooker 100 includes therein the first heating unit 11, the second heating unit 12, and the third heating unit 13, each of which is formed as coils.

At least one of the first heating unit 11, the second heating unit 12, and the third heating unit 13 may be formed as a type of electric heater that performs heating by radiation, for example (a nichrome wire, a halogen heater, or a radiant heater, for instance).

Each of the coils is formed by winding a conductive wire made of a given metal (copper or aluminum, for example) and coated with an insulating film. Each of the coils is supplied with a high-frequency current by a drive circuit 50, and thereby produces a high-frequency magnetic field.

The induction cooker 100 includes therein drive circuits 50, which supply high-frequency power to the coils of the first heating unit 11, the second heating unit 12, and the third heating unit 13, and a controller 45 configured to control the operation of the entire induction cooker including the drive circuits 50.

Figure 2:
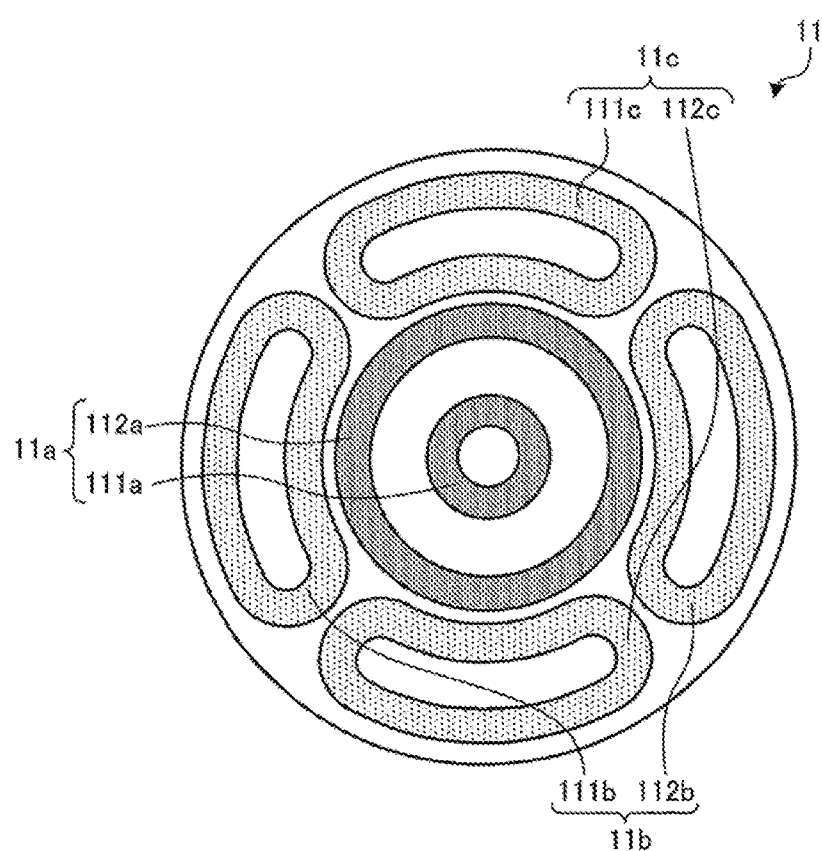
FIG. 2 is a diagram illustrating a first heating unit of the induction cooker according to Embodiment 1.

FIG. 2 is a diagram illustrating the first heating unit of the induction cooker according to Embodiment 1.

In FIG. 2, the first heating unit 11 includes an inner circumferential coil 11a positioned at the center thereof and outer circumferential coils 11b and 11c positioned around the inner circumferential coil 11a. The outer circumference of the first heating unit 11 has a substantially circular shape corresponding to the shape of the first heating area 1.

The inner circumferential coil 11a includes an inner circumferential inner coil 111a and an inner circumferential outer coil 112a, which are positioned substantially concentrically with each other. Each of the inner circumferential inner coil 111a and the inner circumferential outer coil 112a has a circular shape in a plan view, and is formed as a conductive wire made of a given metal (copper or aluminum, for example), coated with an insulating film, and wound in the circumferential direction. The inner circumferential inner coil 111a and the inner circumferential outer coil 112a are connected in series and subjected to drive control of one of the drive circuits 50. The inner circumferential inner coil 111a and the inner circumferential outer coil 112a may be connected in parallel, and may be driven with mutually independent drive circuits (inverter circuits).

The outer circumferential coil 11b includes an outer circumferential left coil 111b and an outer circumferential right coil 112b. The outer circumferential coil 11c includes an outer circumferential upper coil 111c and an outer circumferential lower coil 112c. The outer circumferential left coil 111b and the outer circumferential right coil 112b are connected in series and subjected to drive control of one of the drive circuits 50. Further, the outer circumferential upper coil 111c and the outer circumferential lower coil 112c are connected in series and subjected to drive control of one of the drive circuits 50.

The outer circumferential left coil 111b, the outer circumferential right coil 112b, the outer circumferential upper coil 111c, and the outer circumferential lower coil 112c (hereinafter also referred to as "the outer circumferential coils") are positioned around the inner circumferential coil 11a to be substantially along a circular outer shape of the inner circumferential coil 11a.

Each of the four outer circumferential coils has a substantially quarter arc shape (banana or cucumber shape) in a plan view, and is formed as a conductive wire made of a given metal (copper or aluminum, for example), coated with an insulating film, and wound along the quarter arc shape of the outer circumferential coil. That is, in a quarter arc-shaped area adjacent to the inner circumferential coil 11a, each of the outer circumferential coils is formed to substantially extend along the circular shape of the inner circumferential coil 11a in a plan view. The number of the outer circumferential coils is not limited to four. Further, the shape of each of the outer circumferential coils is not limited to the above-described one. For example, a configuration with a plurality of circular outer circumferential coils may be employed.

Figure 3:
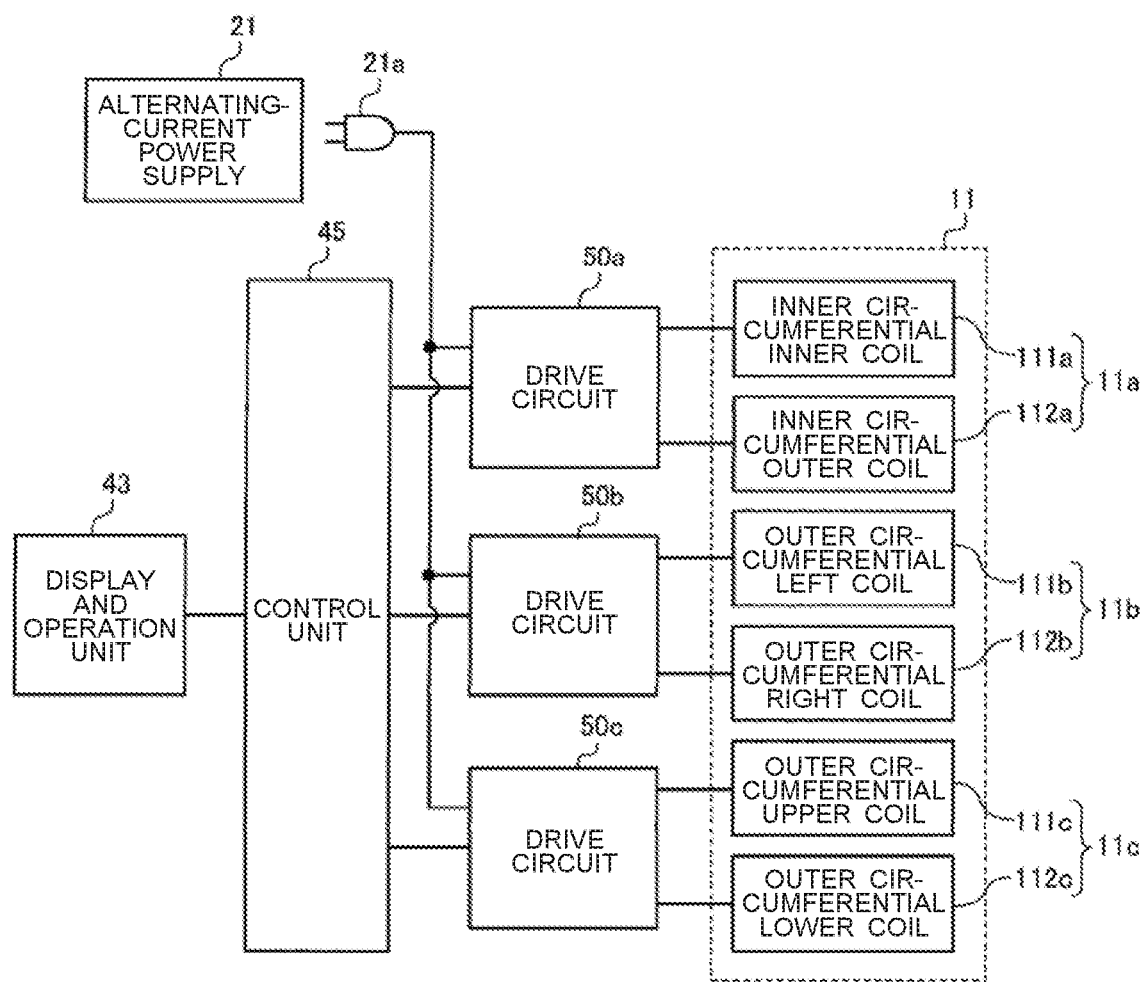
FIG. 3 is a block diagram illustrating drive circuits of the first heating unit of the induction cooker according to Embodiment 1.

FIG. 3 is a block diagram illustrating the drive circuits of the first heating unit of the induction cooker according to Embodiment 1.

As illustrated in FIG. 3, the first heating unit 11 is subjected to drive control of drive circuits 50a, 50b, and 50c. That is, the inner circumferential inner coil 111a and the inner circumferential outer coil 112a forming the inner circumferential coil 11a are subjected to drive control of the drive circuit 50a. Further, the outer circumferential left coil 111b and the outer circumferential right coil 112b forming the outer circumferential coil 11b are subjected to drive control of the drive circuit 50b. Further, the outer circumferential upper coil 111c and the outer circumferential lower coil 112c forming the outer circumferential coil 11c are subjected to drive control of the drive circuit 50c.

The drive circuits 50a, 50b, and 50c are supplied with an alternating-current power supply (commercial power supply) 21 from a single alternating-current power supplying unit 21a. That is, the single alternating-current power supplying unit 21a, without any additional alternating-current power supply unit 21a, constitutes the alternating-current power supply 21 to the induction cooker 100. The alternating-current power supplying unit 21a is formed as a power supply plug connected to an outlet supplied with the alternating-current power supply 21. The configuration of the alternating-current power supplying unit 21a is not limited thereto. For example, the alternating-current power supplying unit 21a may be formed as a connection terminal connected to a power supply cable through which power from the alternating-current power supply 21 is supplied. A method may be employed which uses a round terminal, for example, as the connection terminal, and places an end portion of the power supply cable on the round terminal and fixes the end portion to the round terminal with a screw.

FIG. 3 illustrates a case in which the drive circuits 50a, 50b, and 50c that drive the first heating unit 11 are supplied with the alternating-current power supply 21 via the single alternating-current power supplying unit 21a. However, the present invention is not limited thereto. Each of the drive circuits that drive the first heating unit 11, the second heating unit 12, and the third heating unit 13 may be configured to be supplied with power from the alternating-current power supply 21 via the single alternating-current power supplying unit 21a.

The controller 45 is formed as a device such as a microcomputer or a digital signal processor (DSP). Based on information such as the information of operations sent from the display and operation unit 43, the controller 45 controls each of the drive circuits 50a, 50b, and 50c. The controller 45 further displays information on the display and operation unit 43 in accordance with factors such as the operating state.

Figure 4:
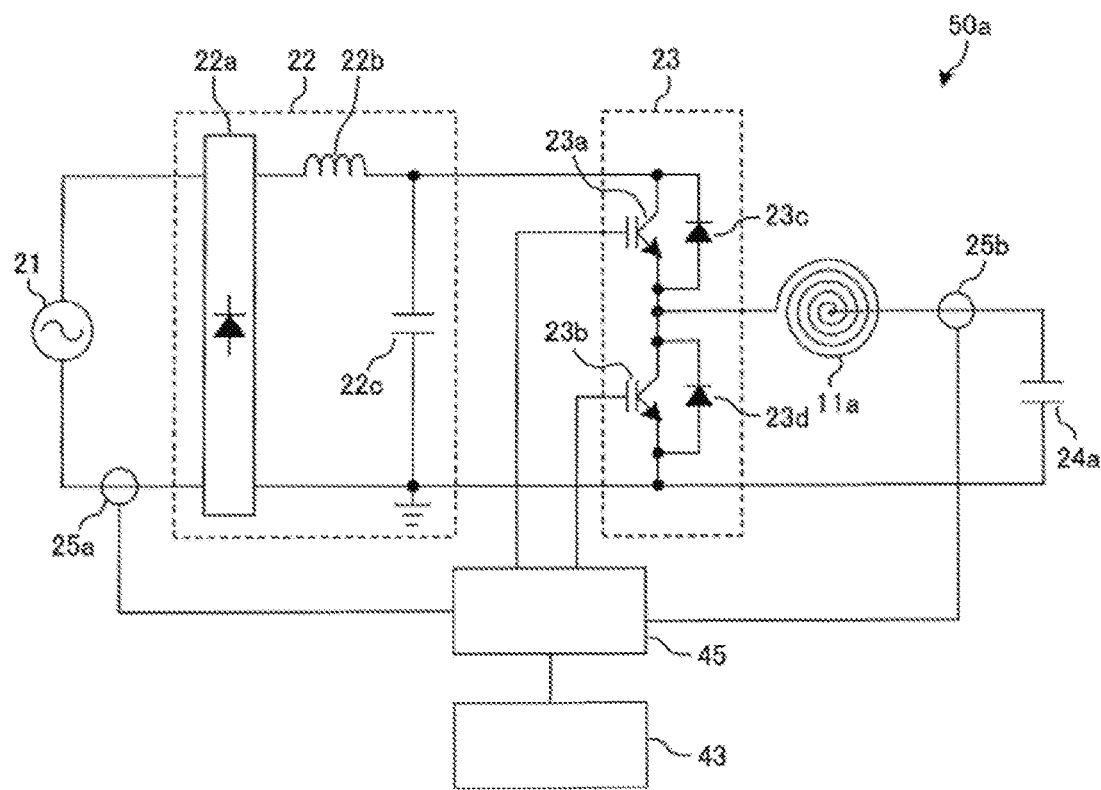
FIG. 4 is a diagram illustrating one of the drive circuits of the induction cooker according to Embodiment 1.

FIG. 4 is a diagram illustrating one of the drive circuits of the induction cooker according to Embodiment 1. The drive circuits 50, which are provided for the respective heating units, may have the same circuit configuration, or may have different circuit configurations for the respective heating units. FIG. 4 illustrates the drive circuit 50a that drives the inner circumferential coil 11a.

As illustrated in FIG. 4, the drive circuit 50a includes a direct-current power supply circuit 22, an inverter circuit 23, and a resonant capacitor 24a.

An input current detecting unit 25a, which is formed as a current sensor, for example, detects a current to be input to the direct-current power supply circuit 22 from the alternating-current power supply 21, and outputs a voltage signal corresponding to the value of the input current to the controller 45.

The direct-current power supply circuit 22, which includes a diode bridge 22a, a reactor 22b, and a smoothing capacitor 22c, converts an alternating-current voltage input thereto from the alternating-current power supply 21 into a direct-current voltage, and outputs the direct-current voltage to the inverter circuit 23.

The inverter circuit 23 is what is called a half-bridge inverter, in which IGBTs 23a and 23b serving as switching elements are connected in series with outputs of the direct-current power supply circuit 22, and diodes 23c and 23d are connected in parallel with the IGBTs 23a and 23b, respectively, as flywheel diodes. The IGBTs 23a and 23b are driven on and off by a drive signal output from the controller 45. The controller 45 outputs the drive signal, which alternately turns on and off the IGBTs 23a and 23b by placing the IGBT 23b in the OFF state when the IGBT 23a is kept on and placing the IGBT 23b in the ON state when the IGBT 23a is kept off. Thereby, the inverter circuit 23 converts the direct-current power output from the direct-current power supply circuit 22 into alternating-current power having a high frequency ranging from approximately 20 kHz to approximately 100 kHz, and supplies the alternating-current power to a resonant circuit including the inner circumferential coil 11a and the resonant capacitor 24a.

The resonant capacitor 24a are connected in series with the inner circumferential coil 11a, and the resonant circuit has a resonant frequency according to factors such as the inductance of the inner circumferential coil 11a and the capacitance of the resonant capacitor 24a. When magnetic coupling of the heating target 5 (a metal load) occurs, the inductance of the inner circumferential coil 11a changes in accordance with characteristics of the metal load, and the resonant frequency of the resonant circuit changes in accordance with the change in the inductance.

With this configuration, a high-frequency current of approximately tens of amperes flows through the inner circumferential coil 11a, and the heating target 5 placed on a part of the top plate 4 immediately above the inner circumferential coil 11a is inductively heated by a high-frequency magnetic flux produced by the flowing high-frequency current. Each of the IGBTs 23a and 23b serving as a switching element is made of a semiconductor comprising a silicon-based material, for example, but may be formed with a wideband gap semiconductor made of a material such as a silicon carbide-based material or a gallium nitride-based material.

By using the wideband gap semiconductor for the switching element, it is possible to reduce power supply loss of the switching element and realize favorable heat transfer from the drive circuit even if the switching frequency (driving frequency) is increased to a high frequency (high speed). Accordingly, it is possible to reduce the size of heat transfer fins of the drive circuit, and thus to reduce the size and cost of the drive circuit.

A coil current detecting unit 25b is connected to the resonant circuit including the inner circumferential coil 11a and the resonant capacitor 24a. The coil current detecting unit 25b, which is formed as a current sensor, for example, detects the current flowing through the inner circumferential coil 11a and outputs a voltage signal corresponding to the value of the coil current to the controller 45.

The drive circuit 50a that drives the inner circumferential coil 11a has been described with reference to FIG. 4. A configuration similar to the configuration of the drive circuit 50a is also applicable to the drive circuit 50b that drives the outer circumferential coil 11b and the drive circuit 50c that drives the outer circumferential coil 11c. The drive circuits 50a, 50b, and 50c may be connected in parallel with the alternating-current power supply 21.

Figure 5:
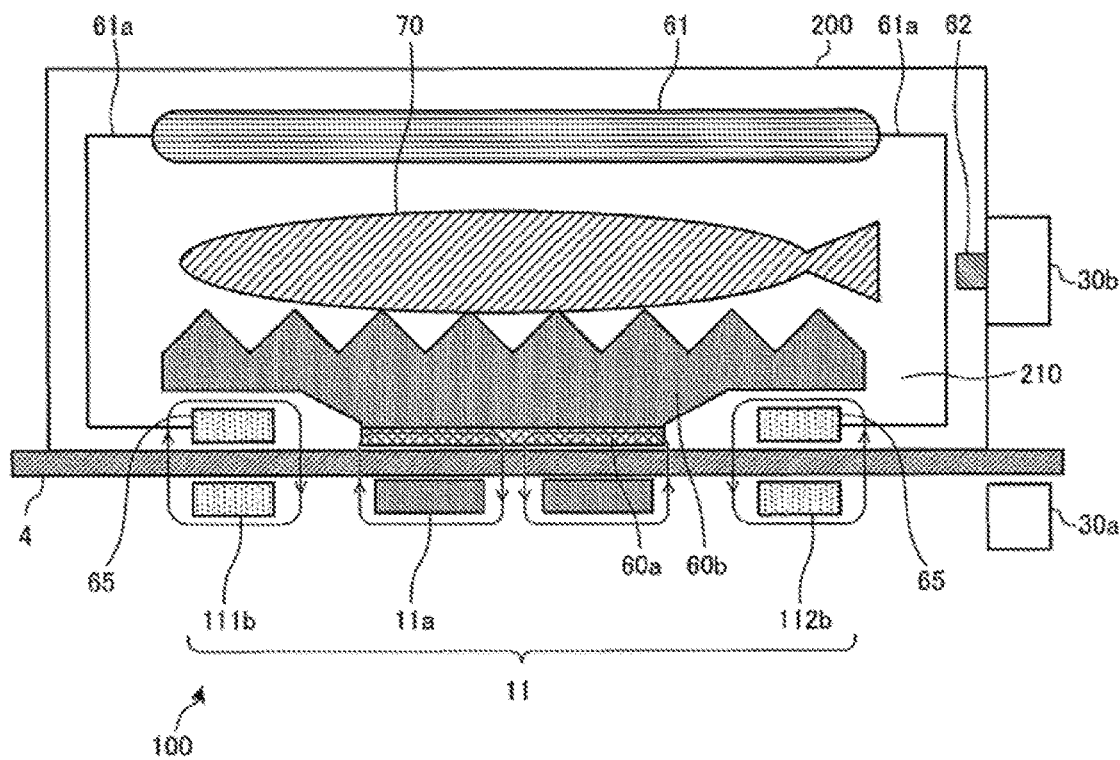
FIG. 5 is a schematic diagram illustrating a configuration of the induction cooker and a cooking device of the heating cooker system according to Embodiment 1.

FIG. 5 is a schematic diagram illustrating a configuration of the induction cooker and the cooking device of the heating cooker system according to Embodiment 1.

In FIG. 5, the heating cooker system includes the induction cooker 100 and the cooking device 200. FIG. 5 illustrates a state in which the cooking device 200 is placed on the top plate 4 of the induction cooker 100. Further, FIG. 5 schematically illustrates a longitudinal section of the induction cooker 100 and the cooking device 200 viewed from a front side thereof in a state in which the cooking device 200 is placed above the first heating unit 11.

In FIG. 5, the inner circumferential coil 11a and the outer circumferential coil 11b (the outer circumferential left coil 111b and the outer circumferential right coil 112b) are positioned under the top plate 4 of the induction cooker 100. Illustration of the outer circumferential upper coil 111c and the outer circumferential lower coil 112c forming the outer circumferential coil 11c is omitted in FIG. 5. In FIG. 5, arrows illustrated around the inner circumferential coil 11a and a magnetic member 60a, arrows illustrated around the outer circumferential left coil 111b and a power receiving coil 65, and arrows illustrated around the outer circumferential right coil 112b and a power receiving coil 65 represent magnetic flux lines.

The induction cooker 100 is provided with a first transmitting and receiving unit 30a that communicates with the cooking device 200. The first transmitting and receiving unit 30a is formed as a wireless communication interface conforming to a given communication standard, such as WI-FI (registered trademark) communication, BLUETOOTH (registered trademark) communication, infrared communication, or near field communication (NFC), for example. The first transmitting and receiving unit 30a communicates information to and from a second transmitting and receiving unit 30b of the cooking device 200.

The cooking device 200 is a device that cooks a food 70, such as fish, for example. The cooking device 200 is detachably supported by the induction cooker 100. For example, the cooking device 200 is placed on the top plate 4 of the induction cooker 100. A heating chamber 210 for storing the food 70 is formed in a housing of the cooking device 200. The cooking device 200 includes the magnetic member 60a, a cooking tray 60b, an upper heater 61, a temperature sensor 62, power receiving coils 65, and the second transmitting and receiving unit 30b.

The magnetic member 60a is made of a magnetic material, such as iron, for example, and is positioned on a bottom surface of the cooking device 200. The magnetic member 60a is inductively heated when positioned in a high-frequency magnetic field produced by the inner circumferential coil 11a in the induction cooker 100.

The cooking tray 60b has an upper surface having corrugated irregularities, for example, and the food 70, such as fish, for example, is placed on the upper surface. The cooking tray 60b is positioned in contact with an upper surface of the magnetic member 60a, for example, and the food 70 is placed on the cooking tray 60b. The cooking tray 60b is made of a non-magnetic metal, such as aluminum, for example, and is thermally coupled (joined) with the magnetic member 60a. The position of the cooking tray 60b is not limited to the upper surface of the magnetic member 60a, and it suffices if the cooking tray 60b is disposed at a position at which the cooking tray 60b receives the heat transferred from the magnetic member 60a.

The configuration may be modified such that the magnetic member 60a and the cooking tray 60b are replaced by a cooking plate or a pot detachably stored in the heating chamber 210 as an inductively heated target.

Further, the magnetic member 60a and the cooking tray 60b may both be made of a magnetic material, such as iron, for example, or may be integrally formed with a magnetic material.

The power receiving coils 65 are positioned on the bottom surface of the cooking device 200. Each of the power receiving coils 65 is formed as a conductive wire made of a given metal (copper or aluminum, for example), coated with an insulating film, and wound in the circumferential direction. When positioned in a high-frequency magnetic field produced by the outer circumferential coil 11b in the induction cooker 100, the power receiving coil 65 receives supply of electric power through electromagnetic induction or magnetic field resonance.

The upper heater 61 is connected to the power receiving coils 65 by wires 61a. The upper heater 61 is formed as a heating element that generates heat (or that is driven) with the electric power received by the power receiving coils 65. For example, a sheathed heater being a resistance heating element is employed as the upper heater 61. The specific configuration of the upper heater 61 is not limited thereto, and a given heating element such as a halogen heater or a far-infrared heater may be employed.

The temperature sensor 62 is positioned in the heating chamber 210 to detect the temperature in the heating chamber 210. For example, a platinum resistance temperature detector, a thermistor, or a thermocouple is employed as the temperature sensor 62. A plurality of temperature sensors 62 may be provided as necessary. Further, the temperature sensor 62 is not necessarily positioned on a wall surface of the heating chamber 210, and may be provided on a top surface or a bottom surface of the heating chamber 210 or on the cooking tray 60b as necessary. Further, a non-contact temperature sensor 62 may be provided which detects the amount of infrared rays radiated from the food 70 to detect the surface temperature of the food 70.

The second transmitting and receiving unit 30b is formed as a wireless communication interface conforming to the communication standard of the first transmitting and receiving unit 30a. The second transmitting and receiving unit 30b communicates information to and from the first transmitting and receiving unit 30a of the induction cooker 100. The second transmitting and receiving unit 30b transmits to the first transmitting and receiving unit 30a information such as the information of the temperature detected by the temperature sensor 62, information uniquely assigned to the cooking device 200, information representing the device type of the cooking device 200, and information related to device specifications of the cooking device 200.

The configuration may be modified such that wall surfaces forming the heating chamber 210 of the cooking device 200 are partially open. For example, an outer frame of the cooking device 200 may be formed only with lateral surfaces and an upper surface of the cooking device 200, leaving a front surface, a rear surface and the bottom surface of the cooking device 200 open. In this case, a space surrounded by the lateral surfaces and the upper surface of the cooking device 200 and the top plate 4 of the induction cooker 100 forms the heating chamber 210.

The magnetic member 60a and the power receiving coils 65 of the cooking device 200 are disposed at respective positions corresponding to the coils positioned under the top plate 4 of the induction cooker 100.

For example, the magnetic member 60a and the power receiving coils 65 are disposed at positions at which the positional relationship between the magnetic member 60a and the power receiving coils 65 corresponds to the positional relationship between the inner circumferential coil 11a and the outer circumferential coils 11b and 11c of the first heating unit 11. One example of the configuration will be described with reference to FIG. 6.

Figure 6:
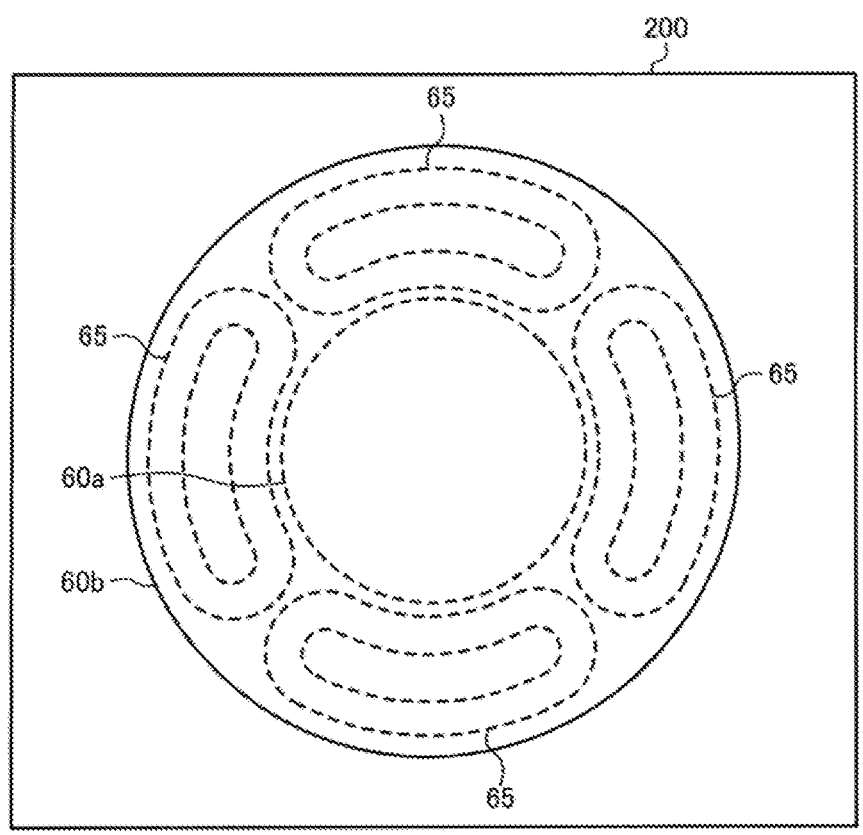
FIG. 6 is a top view schematically illustrating a configuration of the cooking device of the heating cooker system according to Embodiment 1.

FIG. 6 is a top view schematically illustrating a configuration of the cooking device of the heating cooker system according to Embodiment 1.

As illustrated in FIG. 6, in the cooking device 200, the magnetic member 60a and the power receiving coils 65 are positioned under the cooking tray 60b, which has a circular shape, for example.

The magnetic member 60a has a disc shape of an outer diameter substantially the same as the outer diameter of the inner circumferential coil 11a of the induction cooker 100. That is, in a state in which the cooking device 200 is placed on the top plate 4 of the induction cooker 100, the magnetic member 60a of the cooking device 200 is positioned to overlap with the inner circumferential coil 11a of the induction cooker 100 in the vertical direction. Further, the magnetic member 60a has a shape not having a portion overlapping with the outer circumferential coils 11b and 11c in the vertical direction.

Four power receiving coils 65 corresponding to the outer circumferential coils 11b and 11c of the induction cooker 100 are provided around the magnetic member 60a. Each of the four power receiving coils 65 has a shape substantially the same as the shape of each of the coils forming the outer circumferential coils 11b and 11c of the induction cooker 100. That is, each of the four power receiving coils 65 has a substantially quarter arc shape (banana or cucumber shape) in a plan view, and is formed as a conductive wire made of a given metal (copper or aluminum, for example), coated with an insulating film, and wound along the quarter arc shape of the power receiving coil 65.

It is desirable that the power receiving coils 65 of the cooking device 200 are positioned to overlap only with the outer circumferential coils 11b and 11c of the induction cooker 100 and not on the inner circumferential coil 11a of the induction cooker 100 in the vertical direction.

The positions of the power receiving coils 65 are not limited to the positions illustrated in FIG. 6, and it suffices if the power receiving coils 65 are disposed at respective positions at least partially above the outer circumferential coils 11b and 11c when the magnetic member 60a is positioned above the inner circumferential coil 11a. Further, the number of the power receiving coils 65 is not limited to the number illustrated in FIG. 6, and it suffices if at least one power receiving coil 65 is provided. Further, a configuration having a plurality of power receiving coils 65 for one outer circumferential coil may be employed.

With the above-described configuration, when the cooking device 200 is placed on the top plate 4 of the induction cooker 100, the magnetic member 60a and the inner circumferential coil 11a are positioned to overlap with each other in the vertical direction. Further, when a high-frequency current is supplied to the inner circumferential coil 11a from the drive circuit 50a, the magnetic member 60a is inductively heated by a high-frequency magnetic flux (high-frequency magnetic field) produced by the inner circumferential coil 11a. The heat generated in the magnetic member 60a is transferred to the cooking tray 60b, which is thermally coupled with the magnetic member 60a. Thereby, the food 70 placed on the cooking tray 60b is cooked by heating from below.

Further, when the cooking device 200 is placed on the top plate 4 of the induction cooker 100, the power receiving coils 65 and the outer circumferential coils 11b and 11c are positioned to overlap with each other in the vertical direction. Further, when high-frequency currents are supplied to the outer circumferential coils 11b and 11c from the drive circuits 50b and 50c, respectively, high-frequency magnetic fluxes (high-frequency magnetic fields) are produced by the outer circumferential coils 11b and 11c. With the high-frequency magnetic fluxes (high-frequency magnetic fields) produced by the outer circumferential coils 11b and 11c, electric power (electromotive force) due to electromagnetic induction is generated in the power receiving coils 65 of the cooking device 200. The electric power generated in the power receiving coils 65 is then supplied to the upper heater 61. Thereby, the upper heater 61 generates heat, and the food 70 placed on the cooking tray 60b is cooked by heating from above through thermal radiation.

As described above, the inner circumferential coil 11a of the induction cooker 100 is used as an induction coil for inductively heating the magnetic member 60a of the cooking device 200. Further, the outer circumferential coils 11b and 11c of the induction cooker 100 are used as power supply coils for performing wireless power transmission to the upper heater 61 of the cooking device 200.

That is, cooking by induction heating and cooking by heating with the electric power received through wireless power transmission are simultaneously performed on the single food 70.

The high-frequency current supplied to the inner circumferential coil 11a from the drive circuit 50a corresponds to a "first high-frequency current" of the present invention.

Further, the high-frequency magnetic flux (high-frequency magnetic field) produced by the inner circumferential coil 11a corresponds to a "first high-frequency magnetic field" of the present invention.

The high-frequency current supplied to each of the outer circumferential coils 11b and 11c from the corresponding one of the drive circuits 50b and 50c corresponds to a "second high-frequency current" of the present invention.

Further, the high-frequency magnetic flux (high-frequency magnetic field) produced by each of the outer circumferential coils 11b and 11c corresponds to a "second high-frequency magnetic field" of the present invention.

Although not illustrated in FIGS. 5 and 6, it is desirable to provide ferrite on lower surfaces of the inner circumferential coil 11a and the outer circumferential coils 11b and 11c of the induction cooker 100 as a magnetic member. It is also desirable to similarly provide ferrite on upper surfaces of the power receiving coils 65 of the cooking device 200.

When the outer circumferential coils 11b and 11c are used as the power supply coils, providing ferrite to the outer circumferential coils 11b and 11c facilitates interlinkage of the high-frequency magnetic fluxes, thereby reducing magnetic flux leakage. It is thereby possible to supply the high-frequency power to the power receiving coils 65 more efficiently, and thus to increase power supply conversion efficiency and reduce loss.

Further, when the ferrite on the lower surface of the inner circumferential coil 11a and the ferrite on the lower surfaces of the outer circumferential coils 11b and 11c are independently provided, interference between the high-frequency magnetic flux from the inner circumferential coil 11a and the high-frequency magnetic fluxes from the outer circumferential coils 11b and 11c is reduced. This reduces loss in the wireless power transmission using the outer circumferential coils 11b and 11c as the power supply coils, thereby enabling an increase in power transmission efficiency.

The inner circumferential coil 11a corresponds to a "first coil" of the present invention.

Further, the inverter circuit 23 of the drive circuit 50a corresponds to a "first inverter circuit" of the present invention, and may include the direct-current power supply circuit 22 of the drive circuit 50a.

Further, each of the outer circumferential coils 11b and 11c corresponds to a "second coil" of the present invention.

Further, the inverter circuit 23 of each of the drive circuits 50b and 50c corresponds to a "second inverter circuit" of the present invention, and may include the direct-current power supply circuit 22 of the corresponding one of the drive circuits 50b and 50c.

Further, the magnetic member 60a corresponds to a "heating target" of the present invention.

Further, the upper heater 61 corresponds to a "cooking unit" of the present invention.

Further, the controller 45 corresponds to a "controller" of the present invention.

(Operation)

An operation of the induction cooker of Embodiment 1 will now be described.

A user places the food 70, such as fish, for example, on the cooking tray 60b in the cooking device 200. The user places the cooking device 200 on one of the heating areas of the top plate 4 of the induction cooker 100. The following description will be given of a case in which the cooking device 200 is placed on the first heating area 1 (the first heating unit 11).

The user issues an instruction to start cooking (input heating power) with the display and operation unit 43. The display and operation unit 43 can operate in a dedicated mode (menu) installed thereto for operating the cooking device 200, and by selecting the dedicated mode, the user can cook food easily.

When the instruction to start cooking is issued, the controller 45 of the induction cooker 100 performs a heating operation of controlling the drive circuit 50a in accordance with the heating power for induction heating, to thereby supply high-frequency power to the inner circumferential coil 11a. Thereby, the magnetic member 60a positioned on the lower surface of the cooking tray 60b of the cooking device 200 is inductively heated. Then, the heat generated in the magnetic member 60a by induction heating is transferred to the non-magnetic cooking tray 60b, and the food 70 placed on the upper surface of the cooking tray 60b is directly heated from below.

At the same time, the controller 45 of the induction cooker 100 performs a wireless power transmitting operation of controlling the drive circuits 50b and 50c in accordance with the electric power to be transmitted to the power receiving coils 65, to thereby supply high-frequency power to the outer circumferential coils 11b and 11c. Thereby, the high-frequency power supplied from the outer circumferential coils 11b and 11c is received by the power receiving coils 65 positioned on the lower surface of the cooking device 200. The received power is supplied to the upper heater 61, and the upper heater 61 generates heat. Then, the upper heater 61 heats, from above, the food 70 placed on the upper surface of the cooking tray 60b by thermal radiation.

The rated power of the cooking device 200 is 1500 W, for example. In this case, the controller 45 controls the driving of the drive circuits 50b and 50c such that the electric power to be received by the power receiving coils 65 is equal to or less than the rated power (1500 W).

During the above-described heating operation, the controller 45 may control the drive circuits 50a, 50b, and 50c in accordance with the temperature detected by the temperature sensor 62.

For example, the controller 45 may acquire the information of the temperature detected by the temperature sensor 62 of the cooking device 200 via the first transmitting and receiving unit 30a. Then, the controller 45 may control the driving of the drive circuits 50a, 50b, and 50c in accordance with a temperature such as a set temperature set with the display and operation unit 43 or a temperature preset based on the cooking menu to control the temperature in the heating chamber 210 of the cooking device 200 to be a desired temperature, thereby controlling the heat generation amount (heating power) of each of the magnetic member 60a and the upper heater 61.

A plurality of temperature sensors 62 may be provided in the vertical direction in the heating chamber 210. In this case, in accordance with the temperature detected by one of the temperature sensors 62 provided on the lower side, the controller 45 controls the heating power for inductively heating the magnetic member 60a (the electric power to be supplied to the inner circumferential coil 11a). Further, in accordance with the temperature detected by one of the temperature sensors 62 provided on the upper side, the controller 45 controls the heating power of the upper heater 61 (the electric power to be supplied to the outer circumferential coils 11b and 11c).

As described above, in Embodiment 1, the induction cooker 100 includes the drive circuit 50a that supplies a high-frequency current to the inner circumferential coil 11a and the drive circuits 50b and 50c provided independently of the drive circuit 50a to supply a high-frequency current to the outer circumferential coils 11b and 11c. Further, the cooking device 200 includes the power receiving coils 65 that receive supply of electric power from the outer circumferential coils 11b and 11c and the upper heater 61 that generates heat with the electric power received by the power receiving coils 65.

Therefore, cooking through induction heating and cooking through wireless power transmission can be simultaneously executed. Further, the cooking through induction heating and the cooking through wireless power transmission can be independently controlled. Accordingly, it is possible to obtain an induction cooker capable of nicely cooking food in a short time.

That is, with the drive circuit 50a and the drive circuits 50b and 50c provided independently of each other, it is possible to independently control upper heating with the upper heater 61 and lower heating with the heat from the magnetic member 60a, and thus to obtain an induction cooker capable of nicely cooking food in a short time.

The cooking device 200 further includes the temperature sensor 62 that detects the temperature in the heating chamber 210 of the cooking device 200 and the second transmitting and receiving unit 30b that transmits the information of the detected temperature. The controller 45 acquires the information of the temperature detected by the temperature sensor 62 via the first transmitting and receiving unit 30a. Then, in accordance with the temperature detected by the temperature sensor 62, the controller 45 controls the driving of the drive circuit 50a and the driving of the drive circuits 50b and 50c.

The controller 45 is therefore capable of independently controlling the heating through induction and the heating through wireless power transmission in accordance with the temperature detected by the temperature sensor 62. Accordingly, it is possible to finely control the internal temperature of the cooking device 200 and the temperature of the cooking plate, and thus to perform cooking with few failures.

Further, Embodiment 1 includes the alternating-current power supplying unit 21a connected to the alternating-current power supply 21, and the plurality of drive circuits are supplied with the alternating-current power supply 21 via the single alternating-current power supplying unit 21a. It is therefore possible to improve workability in installing the induction cooker 100.

In Embodiment 1, a description has been given of the outer circumferential coils 11b and 11c, which include four coils. However, the number of the coils is not limited to four. Further, although the four coils are driven by the two drive circuits 50, the combinations of coils and drive circuits (inverter circuits) are not particularly limited. Even if the four coils are independently driven, effects similar to those described above are obtained.

Further, in Embodiment 1, a description has been given of a case in which the first heating unit 11 includes the inner circumferential coil 11a and the outer circumferential coils 11b and 11c positioned therearound. However, the present invention is not limited thereto. It suffices if the coil for inductively heating the magnetic member 60a of the cooking device 200 and the coils for transmitting electric power to the power receiving coils 65 of the cooking device 200 are driven by the separate drive circuits 50 (inverter circuits.

Further, in Embodiment 1, a description has been given of a case in which the cooking device 200 is placed on the top plate 4 of the induction cooker 100. However, the inner circumferential coil 11a and the outer circumferential coils 11b and 11c may be used as induction coils to inductively heat the entire heating area on which the heating target 5, such as a pot, is placed. With the entire heating area thus inductively heated, it is possible to increase an inductively heated area, and thus to obtain an induction cooker capable of sufficiently heating even a large pot.

Further, when inductively heating the placed heating target 5, such as a pot, it is possible to independently control the electric power to be input to the inner circumferential coil 11a and the electric power to be input to the outer circumferential coils 11b and 11c. It is therefore possible to change the inductively heated area by sequentially switching between supply of power to the inner circumferential coil 11a and supply of power to the outer circumferential coils 11b and 11c. With such control, it is possible to perform simmering with convection when cooking food by simmering, and thus to obtain an induction cooker capable of nicely cooking food.

In Embodiment 1, a description has been given of the heating cooker system including the induction cooker 100 and the cooking device 200. However, the present invention is not limited thereto, and all components of the cooking device 200 may be included in the induction cooker 100 to omit the cooking device 200. Further, the components of the cooking device 200 may partially be included in the induction cooker 100.

Modified Example 1

A modified example of the cooking unit driven by the electric power received by the power receiving coils 65 will be described.

Figure 7:
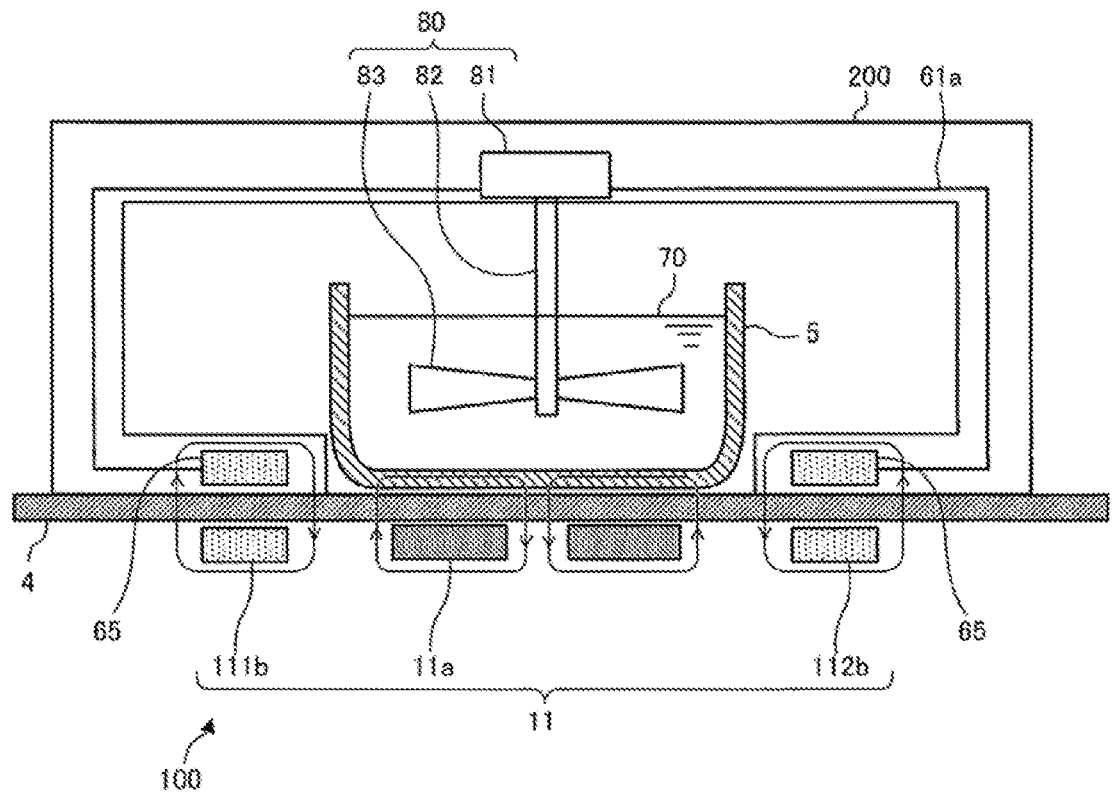
FIG. 7 is a schematic diagram illustrating a modified example of the cooking device of the heating cooker system according to Embodiment 1.

FIG. 7 is a schematic diagram illustrating a modified example of the cooking device of the heating cooker system according to Embodiment 1.

The cooking device 200 illustrated in FIG. 7 includes a stirring device 80 as the cooking unit driven by the electric power received by the power receiving coils 65. The stirring device 80 includes a motor 81, a shaft 82, and a blade unit 83. The motor 81, which is provided to an upper part of the housing of the cooking device 200, for example, is driven to rotate by the electric power received by the power receiving coils 65. The shaft 82 has a rotary shaft disposed in the vertical direction, and has one end connected to the motor 81 to transmit drive force of the motor 81. The blade unit 83, which is attached to the shaft 82, stirs the food 70 with the shaft 82 driven to rotate.

Further, the bottom surface of the housing forming the outer frame of the cooking device 200 illustrated in FIG. 7 is at least partially open. For example, the bottom surface of the housing of the cooking device 200 is open at least in an area overlapping with the inner circumferential coil 11a of the induction cooker 100 in the vertical direction.

In the above-described configuration, when the heating target 5, such as a pot or a frying pan, containing the food 70, such as stew or fried food, for example, is placed on the top plate 4 to overlap with the inner circumferential coil 11a in the vertical direction, the blade unit 83 of the stirring device 80 is placed in the heating target 5. Then, when a high-frequency current is supplied to the inner circumferential coil 11a from the drive circuit 50a, the heating target 5 is inductively heated by a high-frequency magnetic flux (high-frequency magnetic field) produced by the inner circumferential coil 11a. Thereby, the food 70 in the heating target 5 is cooked by heating from below.

Further, when high-frequency currents are supplied to the outer circumferential coils 11b and 11c from the drive circuits 50b and 50c, high-frequency magnetic fluxes (high-frequency magnetic fields) are produced by the outer circumferential coils 11b and 11c. With the high-frequency magnetic fluxes (high-frequency magnetic fields) produced by the outer circumferential coils 11b and 11c, electric power (electromotive force) due to electromagnetic induction is generated in the power receiving coils 65 of the cooking device 200. Then, when the electric power generated in the power receiving coils 65 is supplied to the stirring device 80, the motor 81 is driven to drive the blade unit 83 to rotate via the shaft 82. Thereby, the food 70 in the heating target 5 is cooked by stirring.

With the above-described configuration, cooking by induction heating and cooking by stirring through wireless power transmission are simultaneously executable. Further, the cooking by induction heating and the cooking by stirring through wireless power transmission are independently controllable. Accordingly, it is possible to obtain an induction cooker capable of nicely cooking food in a short time.

Modified Example 1 may be configured to include a power receiving coil 65 corresponding to only a part of the outer circumferential coils 11b and 11c. For example, Modified Example 1 may be configured to include only a power receiving coil 65 corresponding to at least one coil selected from the outer circumferential left coil 111b, the outer circumferential right coil 112b, the outer circumferential upper coil 111c, and the outer circumferential lower coil 112c. In this case, the coils other than the coil corresponding to the power receiving coil 65 may be operated as coils for inductively heating the heating target 5.

In addition to or in place of the marks of the heating areas formed on the top plate 4, position marks representing placement positions of the heating target 5 and position marks representing placement positions of the power receiving coils 65 may be formed by painting or printing, for example.

In Modified Example 1, a description has been given of a case in which the stirring device 80 is driven by the electric power received by the power receiving coils 65. However, the configuration of the cooking unit is not limited thereto.

For example, a cooling device including a Peltier element may be provided as the cooking unit driven by the electric power received by the power receiving coils 65. With this configuration, cooking by induction heating and cooking by cooling through wireless power transmission are simultaneously or sequentially executable. Accordingly, it is possible to perform a wide range of cooking, with the temperature of the heating target 5 and the food 70 being adjustable over a wide range.

Further, for example, a device that turns over the food 70 on the heating target 5 may be provided as the cooking unit driven by the electric power received by the power receiving coils 65. It is thereby possible to bring both the upper side and the lower side of the food 70 into contact with the heating target 5. With the heating target 5 and the food 70 contacting with each other, therefore, it is possible to brown both sides of the food 70, for example.

Modified Example 2

Another configuration example of the drive circuit 50 will be described.

Figure 8:
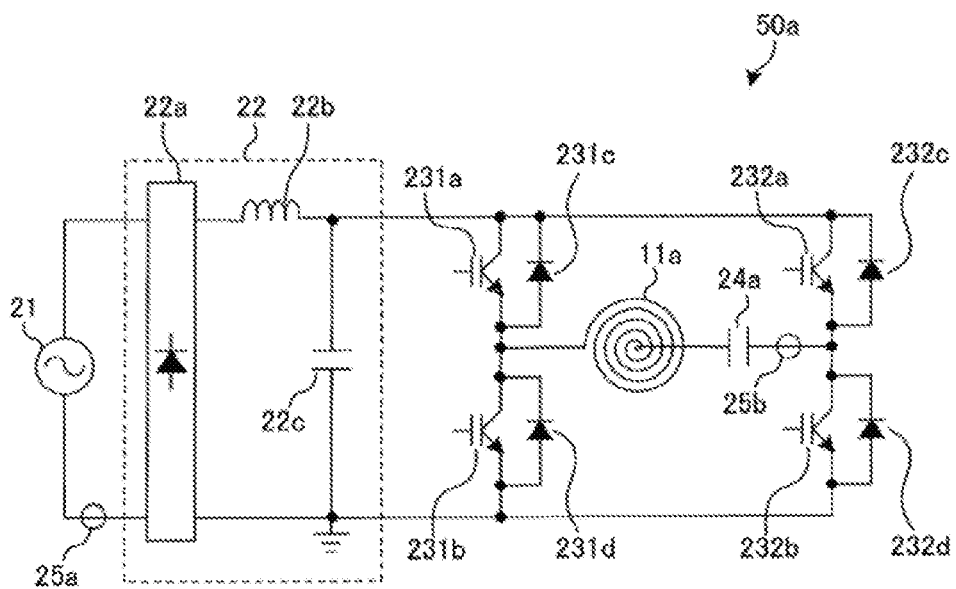
FIG. 8 is a diagram illustrating another drive circuit of the induction cooker according to Embodiment 1.

FIG. 8 is a diagram illustrating another drive circuit of the induction cooker according to Embodiment 1.

The drive circuit 50a illustrated in FIG. 8 is formed as a so-called full-bridge inverter, in which IGBTs 232a and 232b serving as switching elements and diodes 232c and 232d serving as flywheel diodes are additionally connected to the inverter circuit 23 in FIG. 4. The drive circuit 50a illustrated in FIG. 8 is similar to that in FIG. 4 in other configurations, and the same parts as those in FIG. 4 are assigned with the same reference signs.

The controller 45 outputs a drive signal for driving switching elements of the inverter circuit 23 (IGBTs 231a, 231b, 232a, and 232b), and performs control similarly as in the above-described operation such that the electric power to be input to the inner circumferential coil 11a equals the electric power set for the heating operation. Effects similar to those described above are also obtainable with this configuration.

Although FIG. 8 illustrates an example of the drive circuit 50a that drives the inner circumferential coil 11a, this configuration is not limited to the drive circuit 50a, and is also applicable to the other drive circuits.

Modified Example 3

Further, another configuration example of the drive circuits 50 will be described.

Figure 9:
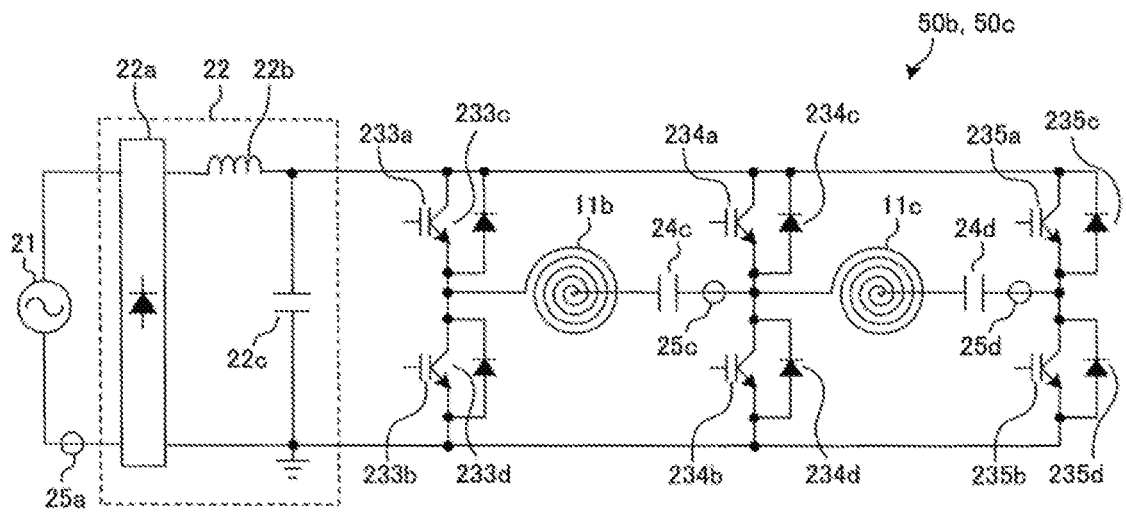
FIG. 9 is a diagram illustrating other drive circuits of the induction cooker according to Embodiment 1.

FIG. 9 is a diagram illustrating other drive circuits of the induction cooker according to Embodiment 1.

In the example illustrated in FIG. 9, the drive circuit 50b that drives the outer circumferential coil 11b and the drive circuit 50c that drives the outer circumferential coil 11c are formed as a full-bridge inverter circuit in which one of arms forming a full bridge is used as a shared arm.

As illustrated in FIG. 9, the drive circuits 50b and 50c are formed as a full-bridge inverter similarly as in FIG. 8. The drive circuits 50b and 50c are configured such that an arm including two IBGTs 234a and 234b is used as a shared arm to perform the drive control of the outer circumferential coil 11b (a power supply coil) with IGBTs 233a and 233b and the shared arm, and perform the drive control of the outer circumferential coil 11c (a power supply coil) with IGBTs 235a and 235b and the shared arm.

In this configuration, it is still possible to separately perform the drive control of the outer circumferential coil 11b and the drive control of the outer circumferential coil 11c, and obtain effects similar to those described above.

Modified Example 4

Another configuration example of the coils forming the first heating unit 11 will now be described.

Figure 10:
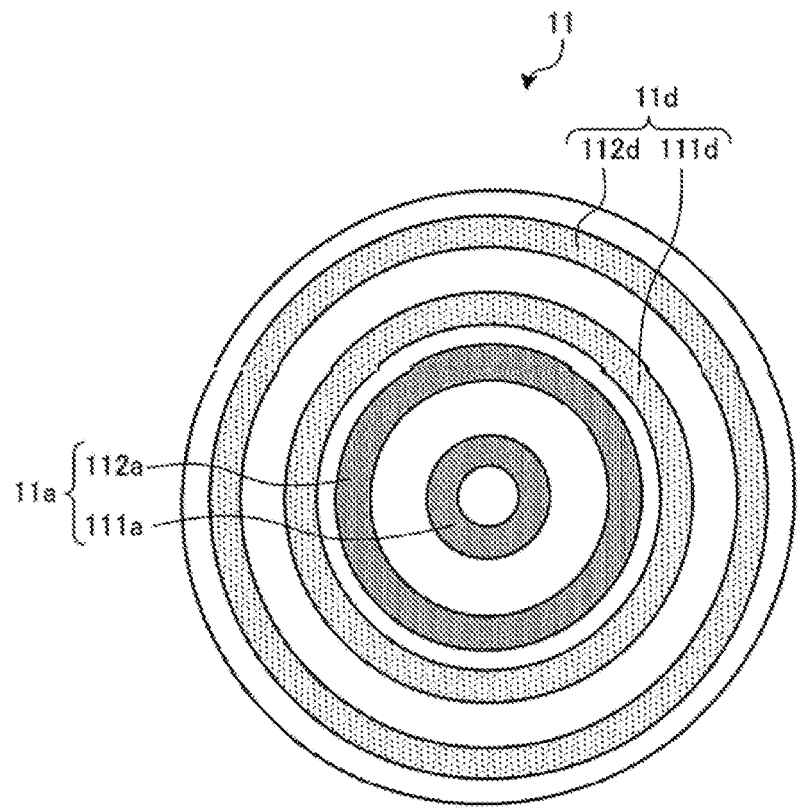
FIG. 10 is a diagram illustrating another first heating unit of the induction cooker according to Embodiment 1.

FIG. 10 is a diagram illustrating another first heating unit of the induction cooker according to Embodiment 1.

The first heating unit 11 illustrated in FIG. 10 includes the inner circumferential coil 11a positioned at the center of the heating area and an outer circumferential coil 11d positioned substantially concentrically with the inner circumferential coil 11a.

Similarly as in the above description, the inner circumferential coil 11a includes the inner circumferential inner coil 111a and the inner circumferential outer coil 112a, which are connected in series and subjected to the drive control of the drive circuit 50a.

The outer circumferential coil 11d includes an outer circumferential inner coil 111d and an outer circumferential outer coil 112d, which are formed concentrically with the inner circumferential coil 11a. The outer circumferential inner coil 11d and the outer circumferential outer coil 112d are connected in series and subjected to drive control of a drive circuit 50d. The configuration of the drive circuit 50d is similar to that of the drive circuit 50a described above.

In this configuration example, the power receiving coils 65 of the cooking device 200 are formed concentrically with the center of the magnetic member 60a to follow the shape of the outer circumferential coil 11d.

In this configuration, the inner circumferential coil 11a of the induction cooker 100 is still used as the induction coil for heating the magnetic member 60a of the cooking device 200. Further, the outer circumferential coil 11d is used as a power supply coil for performing wireless power transmission to the upper heater 61 of the cooking device 200. Thereby, effects similar to those described above are obtainable.

Further, according to the present configuration, the coil configuration is simpler than the foregoing coil configuration in FIG. 2. Therefore, effects similar to those described above are obtainable with an inexpensive configuration.

Embodiment 2

Figure 11:
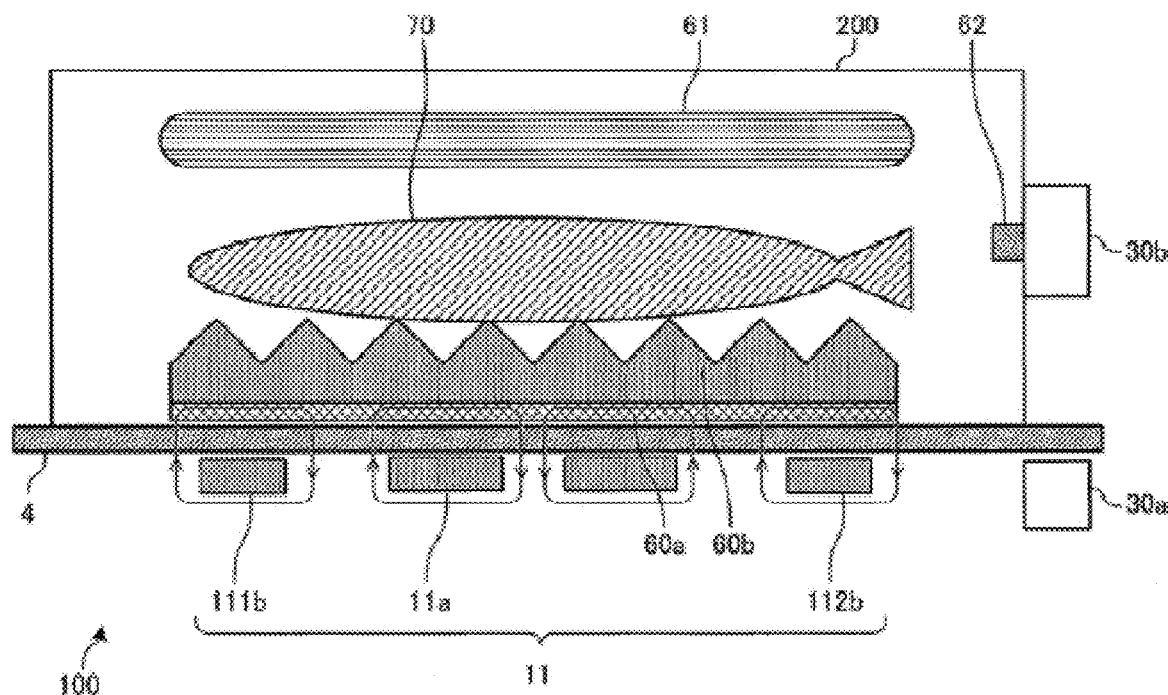
FIG. 11 is a block diagram illustrating a configuration of a cooking device of a heating cooker system according to Embodiment 2.
Figure 12:
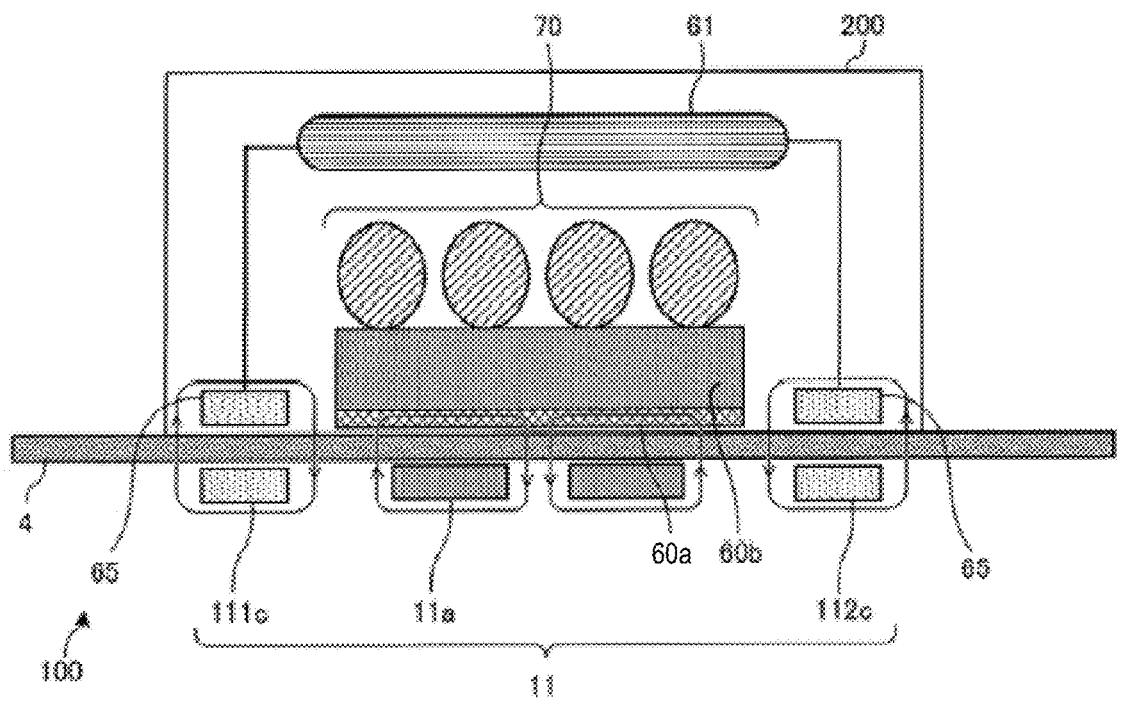
FIG. 12 is a block diagram illustrating the configuration of the cooking device of the heating cooker system according to Embodiment 2.

FIGS. 11 and 12 are block diagrams illustrating a configuration of a cooking device of a heating cooker system according to Embodiment 2.

Figure 13:
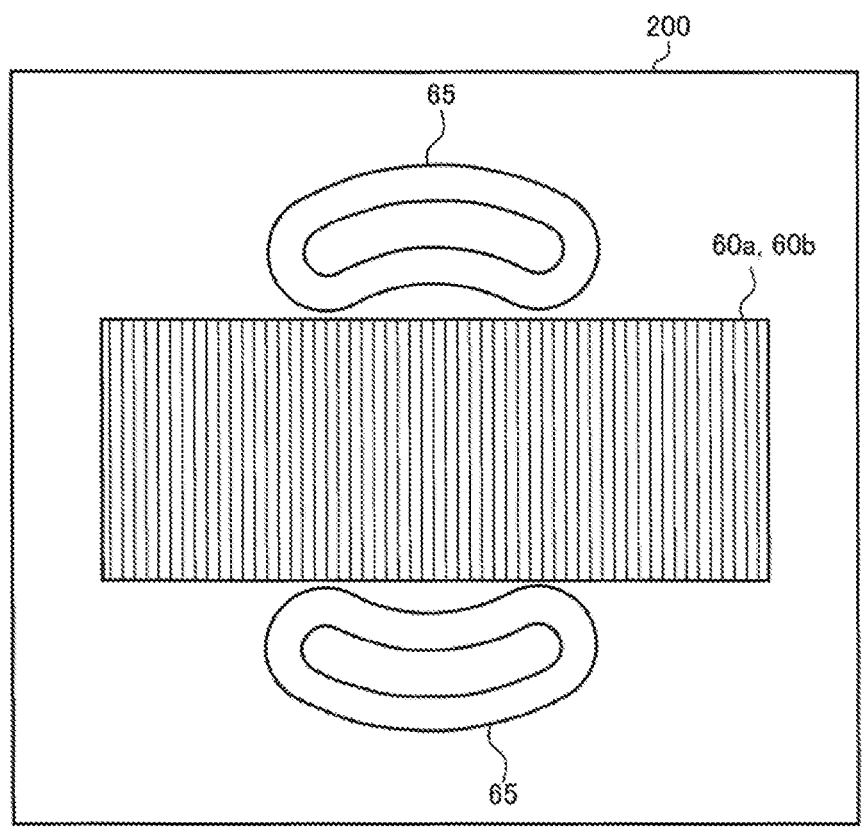
FIG. 13 is a top view schematically illustrating the configuration of the cooking device of the heating cooker system according to Embodiment 2.

FIG. 13 is a top view schematically illustrating the configuration of the cooking device of the heating cooker system according to Embodiment 2.

FIGS. 11 and 12 illustrate a state in which the cooking device 200 is placed on the top plate 4 of the induction cooker 100. Further, FIG. 11 schematically illustrates a longitudinal section of the induction cooker 100 and the cooking device 200 viewed from a front side thereof. Further, FIG. 12 schematically illustrates a longitudinal section of the induction cooker 100 and the cooking device 200 viewed from a lateral side thereof.

The following description will focus on differences from Embodiment 1 described above.

As illustrated in FIGS. 11 to 13, each of the magnetic member 60a and the cooking tray 60b in Embodiment 2 is formed into a rectangular shape in a top view. The magnetic member 60a and the cooking tray 60b are formed such that each of long sides thereof has a length equal to or greater than the width of the corresponding heating area, for example, and that each of short sides thereof has a length substantially equal to the width (outer diameter) of the inner circumferential coil 11a.

For example, when the cooking device 200 is placed on the top plate 4 such that the long sides of the magnetic member 60a and the cooking tray 60b are aligned with the lateral direction, left end portions of the magnetic member 60a and the cooking tray 60b are positioned outside an end portion of the outer circumferential left coil 111b of the induction cooker 100, and that right end portions of the magnetic member 60a and the cooking tray 60b are positioned outside the outer circumferential right coil 112b of the induction cooker 100, as illustrated in FIGS. 11 and 12. Further, the width in the anteroposterior direction of each of the magnetic member 60a and the cooking tray 60b is substantially equal to the width of the inner circumferential coil 11a. That is, each of the magnetic member 60a and the cooking tray 60b has a shape not overlapping with the outer circumferential upper coil 111c and the outer circumferential lower coil 112c.

The power receiving coils 65 of Embodiment 2 are positioned to flank the two long sides of each of the magnetic member 60a and the cooking tray 60b, for example. These power receiving coils 65 are two power receiving coils 65 corresponding to the outer circumferential upper coil 111c and the outer circumferential lower coil 112c of the induction cooker 100. Each of the two power receiving coils 65 has a substantially quarter arc shape (banana or cucumber shape) in a plan view, and is formed as a conductive wire made of a given metal (copper or aluminum, for example), coated with an insulating film, and wound along the quarter arc shape of the power receiving coil 65.

Figure 14:
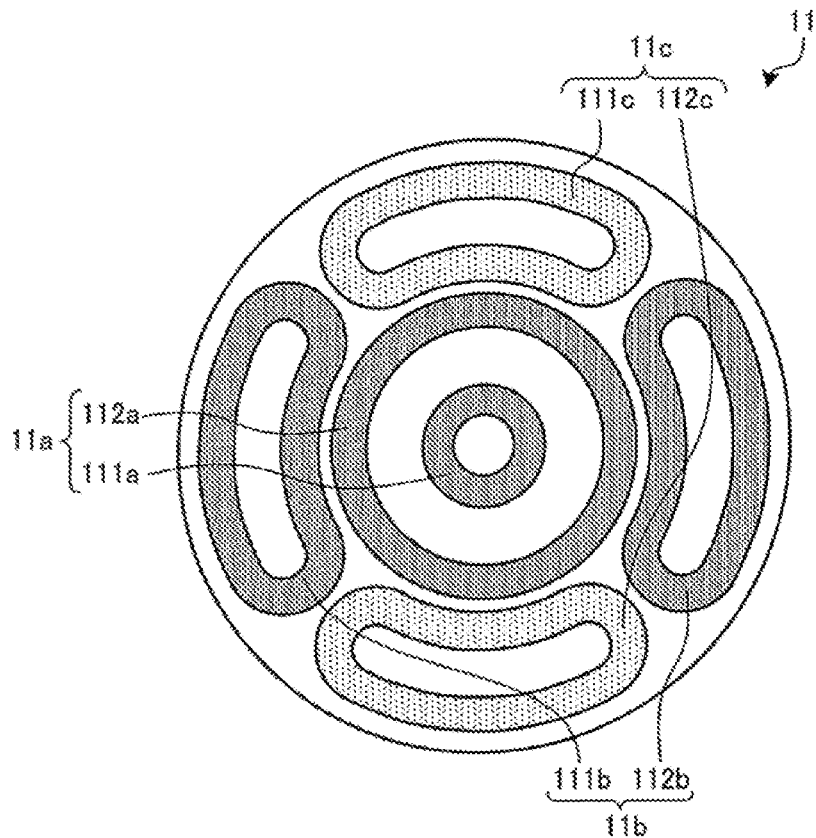
FIG. 14 is a diagram illustrating a first heating unit of an induction cooker according to Embodiment 2.

FIG. 14 is a diagram illustrating a first heating unit of an induction cooker according to Embodiment 2.

In FIG. 14, the configuration of the first heating unit 11 is similar to that of Embodiment 1 described above, but the drive control of the first heating unit 11 by the controller 45 is different from that of Embodiment 1.

That is, the controller 45 performs a heating operation of controlling the drive circuit 50a that drives the inner circumferential coil 11a and the drive circuit 50b that drives the outer circumferential coil 11b (the outer circumferential left coil 111b and the outer circumferential right coil 112b) in accordance with the heating power for induction heating, to thereby supply high-frequency power. Thereby, the magnetic member 60a positioned on the lower surface of the cooking tray 60b of the cooking device 200 is inductively heated. Then, the heat generated in the magnetic member 60a by induction heating is transferred to the non-magnetic cooking tray 60b, and the food 70 placed on the upper surface of the cooking tray 60b is directly heated from below.

At the same time, the controller 45 performs a wireless power transmitting operation of controlling the drive circuit 50c in accordance with the electric power to be transmitted to the power receiving coils 65, to thereby supply high-frequency power to the outer circumferential coil 11c (the outer circumferential upper coil 111c and the outer circumferential lower coil 112c). Thereby, the high-frequency power supplied from the outer circumferential coil 11c is received by the power receiving coils 65 positioned on the lower surface of the cooking device 200. The received power is supplied to the upper heater 61, and the upper heater 61 generates heat. The upper heater 61 then heats, from above, the food 70 placed on the upper surface of the cooking tray 60b by thermal radiation.

As described above, in Embodiment 2, the respective widths of the magnetic member 60a and the cooking tray 60b are increased to be greater than those in Embodiment 1 described above, and the magnetic member 60a is inductively heated by the inner circumferential coil 11a and the outer circumferential coil 11b. With the increase in the area of lower heating through induction heating, therefore, it is possible to add appropriate browning to food from below. For example, even if the food 70 is of an elongated shape, such as fish, it is possible to place the food 70 on the cooking tray 60b and nicely cook the food 70, such as fish, by lower heating.

Herein, the power supply coils for supplying electric power to the upper heater 61 of the cooking device 200 are the outer circumferential upper coil 111c and the outer circumferential lower coil 112c. As compared with the configuration in FIG. 4, the number of coils for supplying electric power to the power receiving coils 65 is reduced. To prevent a reduction in the electric power supplied to the upper heater 61, therefore, the electric power to be supplied to the outer circumferential upper coil 111c and the outer circumferential lower coil 112c is increased. Accordingly, it is possible to obtain the cooking device 200 capable of nicely cooking food in a short time without compromising the cooking time.

Embodiment 3

In Embodiment 3, a description will be given of a configuration in which the cooking through induction heating and the cooking through wireless power transmission are performed with a plurality of heating units.

The following description will focus on differences from Embodiment 1, and the same parts as those of Embodiment 1 described above will be assigned with the same reference signs.

(Configuration)

Figure 15:
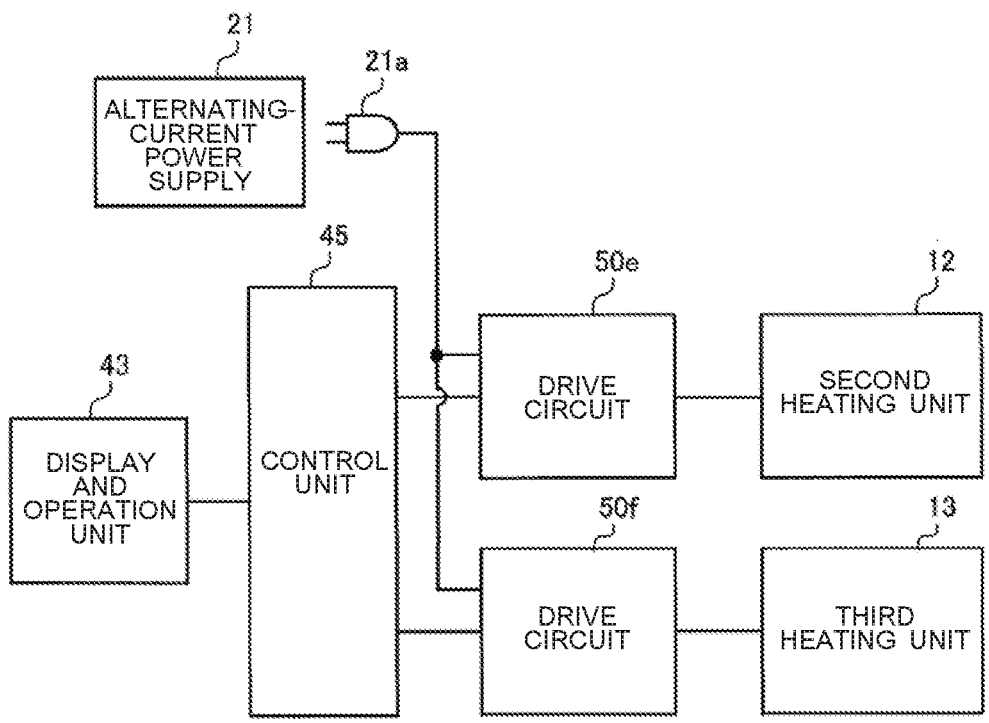
FIG. 15 is a block diagram illustrating drive circuits of a second heating unit and a third heating unit of an induction cooker according to Embodiment 3.

FIG. 15 is a block diagram illustrating respective drive circuits of a second heating unit and a third heating unit of an induction cooker according to Embodiment 3.

As illustrated in FIG. 15, the second heating unit 12 is subjected to drive control of a drive circuit 50e. Further, the third heating unit 13 is subjected to drive control of a drive circuit 50f. That is, a coil (not illustrated) forming the second heating unit 12 is subjected to the drive control of the drive circuit 50e, and a coil (not illustrated) forming the third heating unit 13 is subjected to the drive control of the drive circuit 50f.

Each of the second heating unit 12 and the third heating unit 13 may be configured to include a single coil, include an inner circumferential coil and an outer circumferential coil positioned therearound similarly as in Embodiment 1 described above, or include a plurality of coils disposed concentrically. Further, if each of the second heating unit 12 and the third heating unit 13 is configured to include a plurality of coils, a plurality of drive circuits may be provided for each of the heating units.

The drive circuits 50e and 50f are supplied with the alternating-current power supply (commercial power supply) 21 from the single alternating-current power supplying unit 21a. That is, the single alternating-current power supplying unit 21a alone supplies the alternating-current power supply 21 to the induction cooker 100. The alternating-current power supplying unit 21a is formed as a power supply plug connected to an outlet supplied with the alternating-current power supply 21. The configuration of the alternating-current power supplying unit 21a is not limited thereto, and the alternating-current power supplying unit 21a may be formed as a connection terminal connected to a power supply cable supplied with the alternating-current power supply 21, for example. A method may be employed which uses a round terminal, for example, as the connection terminal, and places an end portion of the power supply cable on the round terminal and fixes the end portion to the round terminal with a screw.

FIG. 15 illustrates a case in which the drive circuit 50e that drives the second heating unit 12 and the drive circuit 50f that drives the third heating unit 13 are supplied with the alternating-current power supply 21 via the single alternating-current power supplying unit 21a. However, the present invention is not limited thereto. Each of the drive circuits that drive the first heating unit 11, the second heating unit 12, and the third heating unit 13 may be configured to be supplied with the alternating-current power supply 21 via the single alternating-current power supplying unit 21a.

Figure 16:
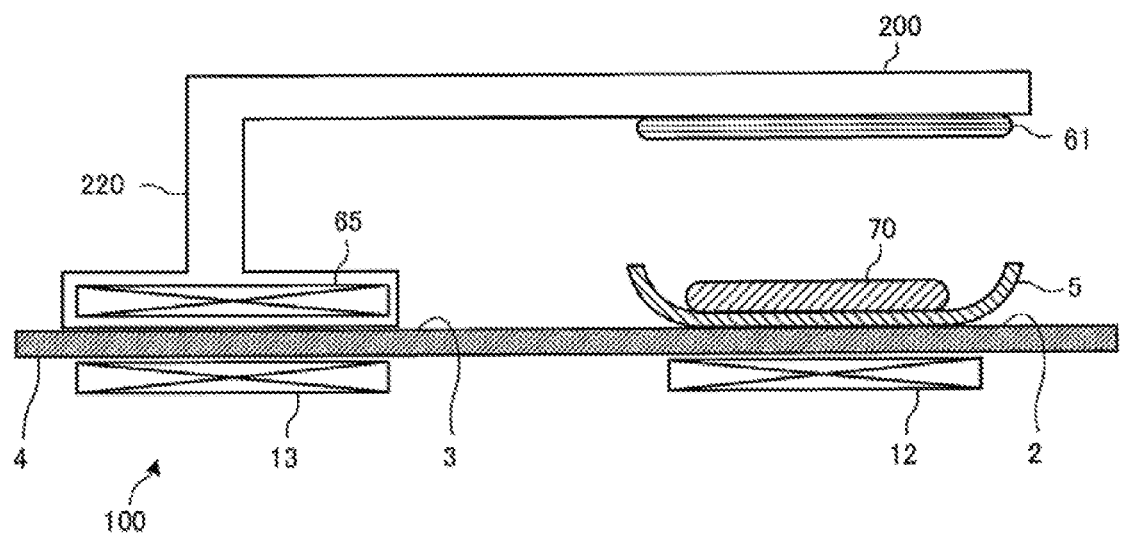
FIG. 16 is a schematic diagram illustrating a configuration of the induction cooker and a cooking device of a heating cooker system according to Embodiment 3.

FIG. 16 is a schematic diagram illustrating a configuration of the induction cooker and a cooking device of a heating cooker system according to Embodiment 3.

In FIG. 16, the heating cooker system includes the induction cooker 100 and the cooking device 200. FIG. 16 illustrates a state in which the cooking device 200 is placed on the top plate 4 of the induction cooker 100. Further, FIG. 16 schematically illustrates a longitudinal section of the induction cooker 100 and the cooking device 200 viewed from a front side thereof in a state in which the heating target 5 is placed above the second heating unit 12 and the cooking device 200 is placed above the second heating unit 12 and the third heating unit 13. The respective disposition positions of the heating target 5 and the cooking device 200 are not limited thereto, and each of the heating target 5 and the cooking device 200 may be disposed above a given one of the plurality of heating units.

The cooking device 200 includes the upper heater 61, the power receiving coils 65, and a support unit 220.

The power receiving coils 65 are positioned at a bottom part of the cooking device 200. Each of the power receiving coils 65 is formed as a conductive wire made of a given metal (copper or aluminum, for example), coated with an insulating film, and wound in the circumferential direction. When positioned in a high-frequency magnetic field produced by a coil in the induction cooker 100, the power receiving coil 65 receives supply of electric power through electromagnetic induction or magnetic field resonance. In the example illustrated in FIG. 16, the power receiving coil 65 receives supply of electric power through a high-frequency magnetic field produced by the coil forming the third heating unit 13.

The upper heater 61 is connected to the power receiving coils 65 by wires (not illustrated). The upper heater 61 is formed as a heating element that generates heat (is driven) with the electric power received by the power receiving coils 65. For example, a sheathed heater being a resistance heating element is employed as the upper heater 61. The specific configuration of the upper heater 61 is not limited thereto, and a given heating element, such as a halogen heater or a far-infrared heater, may be employed. Further, the upper heater 61 is supported by the support unit 220 to be positioned above the heating target 5.

The support unit 220 is formed as the housing forming the outer frame of the cooking device 200. The support unit 220 is formed into an L-shape in cross section, extending upward from the bottom part storing the power receiving coils 65 and thereafter extending in the horizontal direction. That is, the support unit 220 supports the upper heater 61 such that, when the power receiving coils 65 are disposed above the third heating unit 13 (the third heating area 3), the upper heater 61 is positioned above the second heating unit 12 (the second heating area 2) and above the heating target 5.

The distance between the top plate 4 and the upper heater 61 when the cooking device 200 is placed on the top plate 4 is set to exceed the height of an object expected to be used as the heating target 5, such as a pot or a frying pan. The support unit 220 may be configured to be capable of driving the upper heater 61 in the vertical direction.

(Operation)

An operation of the induction cooker of Embodiment 3 will now be described. The following description will be given of a case in which the heating target 5 is placed on the second heating area 2, and the power receiving coils 65 of the cooking device 200 are placed on the third heating area 3, as illustrated in FIG. 16.

The user places the heating target 5, such as a frying pan, for example, on the second heating area 2 of the top plate 4. The user places the power receiving coils 65 of the cooking device 200 (the bottom part of the housing) on the third heating area 3 of the top plate 4.

The user issues an instruction to start cooking with (input heating power to) the second heating area 2 with the display and operation unit 43. The user issues an instruction to start cooking with (start supplying electric power to) the third heating area 3 with the display and operation unit 43.

The display and operation unit 43 is installed with a dedicated mode (menu) for operating the cooking device 200, and selecting the dedicated mode enables easy cooking.

When the instruction to start cooking is issued, the controller 45 of the induction cooker 100 performs a heating operation of controlling the drive circuit 50e in accordance with the heating power for induction heating, to thereby supply high-frequency power to the coil of the second heating unit 12. Thereby, the heating target 5 placed on the second heating area 2 is inductively heated. Then, the food 70 placed in the heating target 5 is directly heated from below.

At the same time, the controller 45 of the induction cooker 100 performs a wireless power transmitting operation of controlling the drive circuit 50f in accordance with the electric power to be transmitted to the power receiving coils 65, to thereby supply high-frequency power to the coil of the third heating unit 13. Thereby, the high-frequency power supplied from the coil of the third heating unit 13 is received by the power receiving coils 65 positioned disposed at the bottom part of the cooking device 200. The received power is supplied to the upper heater 61, and the upper heater 61 generates heat. Then, the upper heater 61 heats, from above, the food 70 in the heating target 5 placed on the second heating area 2 by thermal radiation.

The rated power of the second heating unit 12 is 3000 W, for example. In this case, the controller 45 controls the driving of the drive circuit 50e such that the electric power to be input to the coil forming the second heating unit 12 is equal to or less than the rated power (3000 W).

Further, the rated power of the cooking device 200 is 1500 W, for example. In this case, the controller 45 controls the driving of the drive circuit 50f such that the electric power to be received by the power receiving coils 65 is equal to or less than the rated power (1500 W).

That is, it is possible to make the total electric power of the electric power for inductively heating the heating target 5 and the electric power to be transmitted to the power receiving coils 65 greater than the rated power of a single heating unit.

In Embodiment 3, a description has been given of a case in which wireless power transmission to the power receiving coils 65 is performed with the cooking device 200 placed on the third heating area 3. However, the configuration is not limited thereto. If the cooking device 200 is not placed on the third heating area 3, the heating target 5 may be placed on the third heating area 3 to perform the heating operation with the third heating unit 13.

Further, a given heating area selected from the first heating area 1, the second heating area 2, and the third heating area 3 may be used as a dedicated heating area for wireless power transmission. That is, a mark on the top plate 4 forming the dedicated heating area for wireless power transmission functions as a position mark representing the placement position of the power receiving coils 65.

The mark of the heating area for performing the heating operation on the heating target 5 placed thereon corresponds to a "first position mark" of the present invention, and the position mark representing the placement position of the power receiving coils 65 corresponds to a "second position mark" of the present invention.

As described above, in Embodiment 3, the induction cooker 100 includes the drive circuit 50e that supplies a high-frequency current to the coil of the second heating unit 12 and the drive circuit 50f provided independently of the drive circuit 50e to supply a high-frequency current to the coil of the third heating unit 13. Further, the cooking device 200 includes the power receiving coils 65 that receive supply of electric power from the coil of the third heating unit 13 and the upper heater 61 that generates heat with the electric power received by the power receiving coils 65.

Therefore, the cooking through induction heating and the cooking through wireless power transmission are simultaneously executable. Further, the cooking through induction heating and the cooking through wireless power transmission are independently controllable. Accordingly, it is possible to obtain an induction cooker capable of nicely cooking food in a short time.

That is, with the drive circuit 50e and the drive circuit 50f provided independently of each other, it is possible to independently control upper heating with the upper heater 61 and induction heating with the heat from the heating target 5, and thus to obtain an induction cooker capable of nicely cooking food in a short time.

Further Embodiment 3 includes the alternating-current power supplying unit 21a connected to the alternating-current power supply 21, and the plurality of drive circuits are provided with the alternating-current power supply 21 via the single alternating-current power supplying unit 21a. It is therefore possible to improve the workability in installing the induction cooker 100.

Further, the heating units corresponding to the plurality of heating areas include different heating units for induction heating and wireless power transmission. It is therefore possible to make the total electric power of the electric power for inductively heating the heating target 5 and the electric power to be transmitted to the power receiving coils 65 greater than the rated power of a single heating unit.

Further, all coils forming one heating unit are operated as the heating coils. Therefore, the configuration of Embodiment 3 is capable of inductively heating the heating target 5 of a large size, as compared with the configuration of Embodiment 1 described above.

Modified Example 1

A modified example of the cooking unit driven by the electric power received by the power receiving coils 65 will be described.

Figure 17:
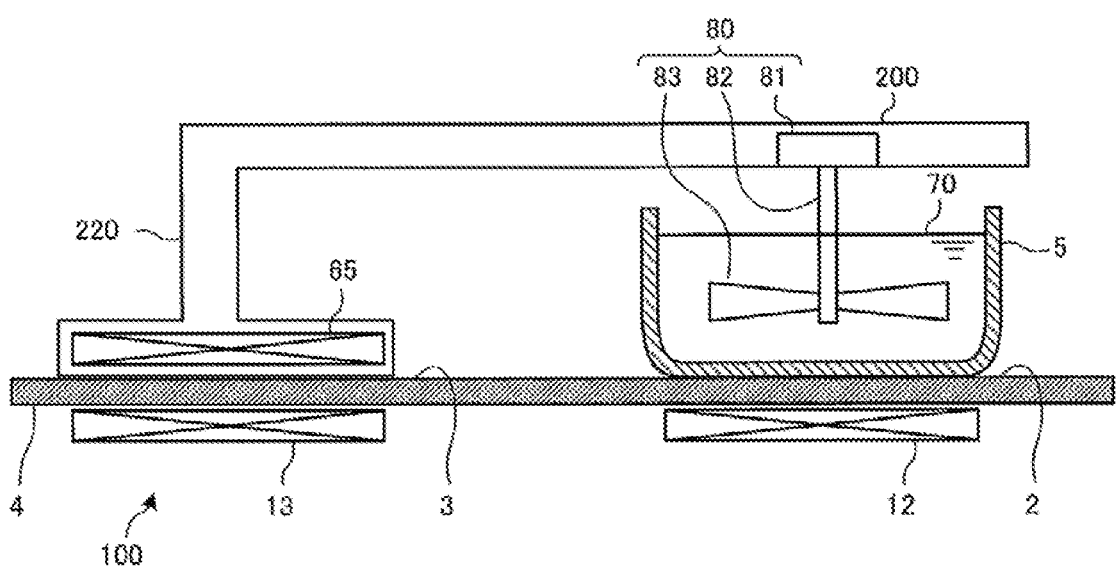
FIG. 17 is a schematic diagram illustrating a modified example of the cooking device of the heating cooker system according to Embodiment 3.

FIG. 17 is a schematic diagram illustrating a modified example of the cooking device of the heating cooker system according to Embodiment 3.

The cooking device 200 illustrated in FIG. 17 includes the stirring device 80 as the cooking unit driven by the electric power received by the power receiving coils 65. The configuration of the stirring device 80 is similar to that of Modified Example 1 of Embodiment 1 described above. Thus, the same components as those of Modified Example 1 of Embodiment 1 are assigned with the same reference signs, and a description thereof will be omitted.

In the cooking device 200 illustrated in FIG. 17, when the heating target 5, such as a pot or a frying pan, containing the food 70, such as stew or fried food, for example, is placed on the second heating area 2, the blade unit 83 of the stirring device 80 is placed in the heating target 5. Then, when a high-frequency current is supplied to the coil of the second heating unit 12 from the drive circuit 50e, the heating target 5 is inductively heated by a high-frequency magnetic flux (high-frequency magnetic field) produced by the coil. Thereby, the food 70 in the heating target 5 is cooked by heating from below.

Further, when a high-frequency current is supplied to the coil of the third heating unit 13 from the drive circuit 50f, a high-frequency magnetic flux (high-frequency magnetic field) is produced by the coil. With the high-frequency magnetic flux (high-frequency magnetic field) produced by the coil of the third heating unit 13, electric power (electromotive force) due to electromagnetic induction is generated in the power receiving coils 65 of the cooking device 200. Then, when the electric power generated in the power receiving coils 65 is supplied to the stirring device 80, the motor 81 is driven to drive the blade unit 83 to rotate via the shaft 82. Thereby, the food 70 in the heating target 5 is cooked by stirring.

With the above-described configuration, cooking by induction heating and cooking by stirring through wireless power transmission are simultaneously executable. Further, the cooking by induction heating and the cooking by stirring through wireless power transmission are independently controllable. Accordingly, it is possible to obtain an induction cooker capable of nicely cooking food in a short time.

In Modified Example 1, a description has been given of a case in which the stirring device 80 is driven by the electric power received by the power receiving coils 65. However, the configuration of the cooking unit is not limited thereto.

For example, a cooling device including a Peltier element may be provided as the cooking unit driven by the electric power received by the power receiving coils 65. With this configuration, the cooking by induction heating and cooking by cooling through wireless power transmission are simultaneously or sequentially executable. Accordingly, it is possible to perform a wide range of cooking, with the temperature of the heating target 5 and the food 70 being adjustable over a wide range.

For example, a device that turns over the food 70 on the heating target 5 may be provided as the cooking unit driven by the electric power received by the power receiving coils 65. It is thereby possible to bring both sides of the food 70 in the vertical direction into contact with the heating target 5. With the heating target 5 and the food 70 contacting with each other, therefore, it is possible to brown the both sides of the food 70, for example.

Embodiment 4

In Embodiment 4, a description will be given of an operation of detecting whether any of the magnetic member 60a and the power receiving coils 65 of the cooking device 200 is placed above a coil of the induction cooker 100, and switching between the heating operation and the wireless power transmitting operation in accordance with the result of the detection.

In Embodiment 4, the configuration of the induction cooker 100 is similar to that of Embodiment 1 described above, and the configuration of the cooking device 200 is similar to that of one of Embodiments 1 to 3 described above.

When the user places the cooking device 200 on one of the heating areas and issues an instruction to start heating (input heating power) with the display and operation unit 43, the controller 45 (a load determining unit) performs a load determining process.

The controller 45 of Embodiment 4 includes the function of a "load determining unit" of the present invention.

Figure 18:
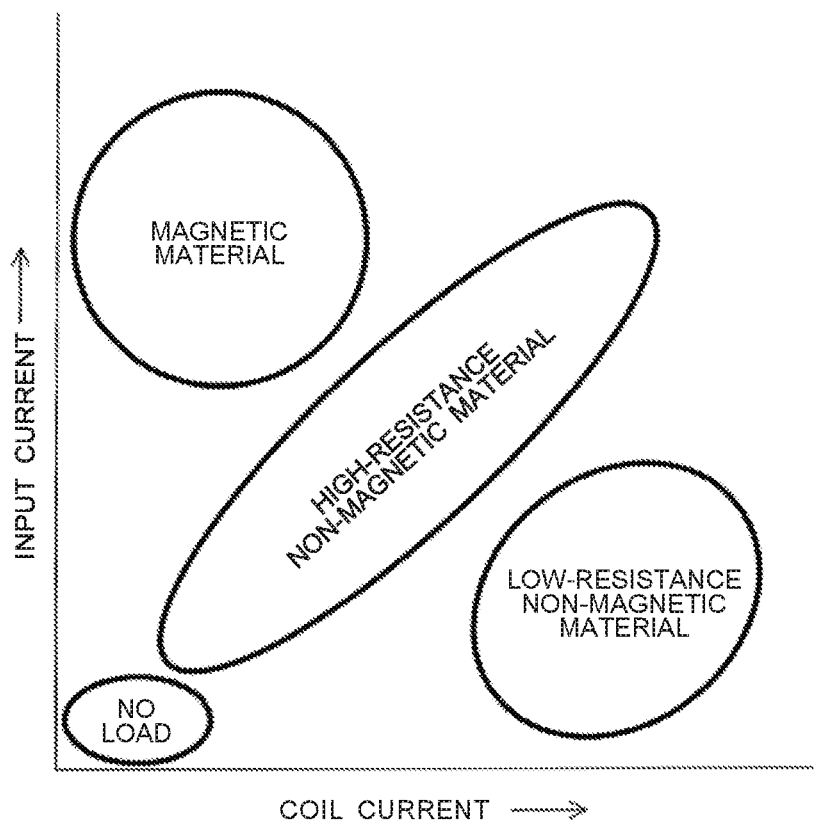
FIG. 18 is a load determining characteristic graph based on the relationship between a coil current and an input current in an induction cooker according to Embodiment 4.

FIG. 18 is a load determining characteristic graph based on the relationship between a coil current and an input current in the induction cooker according to Embodiment 4.

As illustrated in FIG. 18, the relationship between the coil current and the input current changes depending on the material of the load placed above the coil forming the heating unit. The controller 45 previously stores therein a load determining table, which is a table of the relationship between the coil current and the input current illustrated in FIG. 18. With the load determining table stored in the controller 45, it is possible to form the load determining unit with an inexpensive configuration.

In the load determining process, the controller 45 drives the inverter circuit 23 of each of the drive circuits with a specific drive signal for load determination, and detects the input current from the signal output from the input current detecting unit 25a. At the same time, the controller 45 detects the coil current from the signal output from the coil current detecting unit 25b. The controller 45 determines the material of the load placed above the coil based on the detected coil current, the detected input current, and the load determining table representing the relationship of FIG. 18.

If the result of the load determination indicates that the material of the load is a magnetic material, the controller 45 determines that the magnetic member 60a of the cooking device 200 or the heating target 5 is placed above the coil. Further, if the result of the load determination indicates that the material of the load is other than the magnetic material, the controller 45 determines that one of the power receiving coils 65 is placed above the coil. Further, if the result of the load determination indicates that there is no load, the controller 45 determines that none of the magnetic member 60a, the heating target 5, and the power receiving coils 65 is placed.

The controller 45 then performs a heating operation of controlling the drive circuit 50 that drives one of the coils forming the heating unit and determined to have the magnetic member 60a or the heating target 5 placed thereabove, to thereby supply high-frequency power according to the heating power for induction heating.

At the same time, the controller 45 performs a wireless power transmitting operation of controlling the drive circuit 50 that drives one of the coils forming the heating unit and determined to have one of the power receiving coils 65 placed thereabove, to thereby supply high-frequency power according to the electric power to be transmitted to the power receiving coil 65.

The controller 45 stops the operation of the drive circuit 50 that drives one of the coils determined to have no load placed thereabove.

Subsequent operations are similar to those in Embodiment 1 described above.

As described above, in Embodiment 4, whether any of the magnetic member 60a, the heating target 5, and the power receiving coils 65 is placed above the coil is detected, and the heating operation or the wireless power transmitting operation with the coil is performed in accordance with the result of the detection. Accordingly, it is possible to automatically perform an operation according to the configuration and arrangement of the magnetic member 60a and the power receiving coils 65 in the cooking device 200.

The above description has been given of a case in which the load determination is performed based on the correlation between the input current and the coil current. However, the present invention is not limited thereto, and a given load determining process may be employed. For example, the frequency of the high-frequency current to be supplied to the coil may be continuously changed, and the load determination may be performed based on change characteristics of the input current during the change.

Embodiment 5

Figure 19:
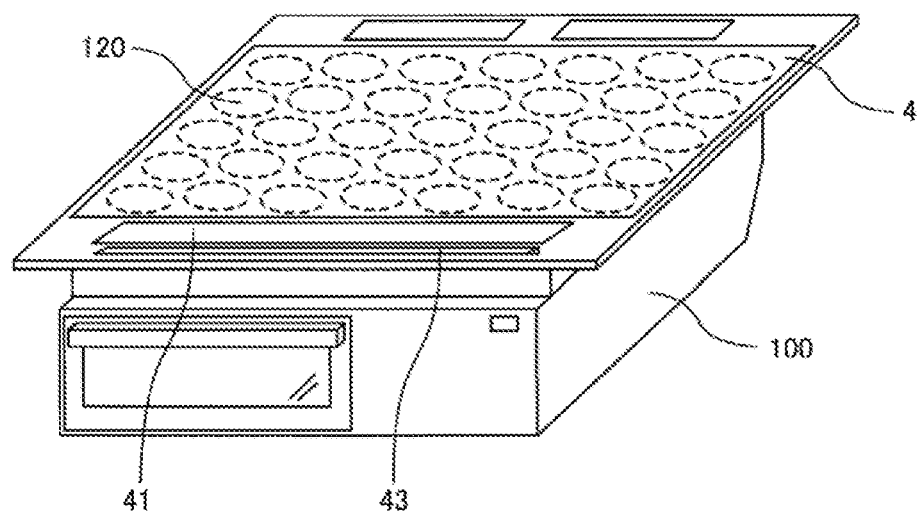
FIG. 19 is a perspective view illustrating a schematic configuration of an induction cooker according to Embodiment 5.

FIG. 19 is a perspective view illustrating a schematic configuration of an induction cooker according to Embodiment 5.

As illustrated in FIG. 19, in the induction cooker 100 according to Embodiment 5, a plurality of coils 120 each having a relatively small size are positioned under the top plate 4 to be substantially evenly dispersed.

Each of the plurality of coils 120 is independently driven by a corresponding drive circuit 50, or some adjacent coils of the plurality of coils 120 are driven as one coil group by a corresponding drive circuit 50. The configuration of the drive circuit 50 that drives the coil 120 is similar to the configuration of the drive circuit 50a of Embodiment 1 described above, for example.

Further, for each of the plurality of coils 120, the controller 45 of Embodiment 5 performs load determination to determine the load placed thereabove. The load determining process is similar to that of Embodiment 4 described above.

In the configuration of Embodiment 5, the marks of the heating areas may not be provided on the top plate 4. The number of the coils 120 may be any number. Further, the layout of the coils 120 is not limited to the above-described one. The coils 120 may be arranged in a honeycomb pattern, or may include large coils 120 and small coils 120 mixedly arranged.

(Operation)

When the user places the cooking device 200 at a given position on the top plate 4 and issues an instruction to start heating (input heating power) with the display and operation unit 43, the controller 45 (the load determining unit) performs a load determining process.

With an operation similar to that of Embodiment 4 described above, the controller 45 performs, for each of the plurality of coils 120, a load determining process of determining the material of the load placed thereabove.

If the result of the load determination indicates that the material of the load is a magnetic material, the controller 45 determines that the magnetic member 60a of the cooking device 200 or the heating target 5 is placed above the coil 120. Further, if the result of the load determination indicates that the material of the load is other than the magnetic material, the controller 45 determines that one of the power receiving coils 65 is placed above the coil 120. Further, if the result of the load determination indicates that there is no load, the controller 45 determines that none of the magnetic member 60a, the heating target 5, and the power receiving coils 65 is placed.

The controller 45 then performs a heating operation of controlling the drive circuit 50 that drives one of the plurality of coils 120 determined to have the magnetic member 60a or the heating target 5 placed thereabove, to thereby supply high-frequency power according to the heating power for induction heating.

At the same time, the controller 45 performs a wireless power transmitting operation of controlling the drive circuit 50 that drives one of the plurality of coils 120 determined to have one of the power receiving coils 65 placed thereabove, to thereby supply high-frequency power according to the electric power to be transmitted to the power receiving coil 65.

The controller 45 stops the operation of the drive circuit 50 that drives one of the plurality of coils 120 determined to have no load placed thereabove.

Subsequent operations are similar to those in Embodiment 1 described above.

As described above, Embodiment 5 includes the plurality of coils 120 positioned under the top plate 4 to be substantially evenly dispersed. Further, the controller 45 detects, for each of the plurality of coils 120, whether any of the magnetic member 60a, the heating target 5, and the power receiving coils 65 is placed thereabove. The controller 45 then performs the heating operation or the wireless power transmitting operation with the coil 120 in accordance with the result of the detection. Accordingly, it is possible to automatically perform an operation according to the configuration and arrangement of the heating target 5 and the magnetic member 60a and the power receiving coils 65 of the cooking device 200.

Further, it is possible to place the cooking device 200 at a given position on the top plate 4, and thus to improve convenience.

REFERENCE SIGNS LIST 1 first heating area 2 second heating area 3 third heating area 4 top plate 5 heating target 11 first heating unit 11a inner circumferential coil 11b outer circumferential coil 11c outer circumferential coil 11d outer circumferential coil 12 second heating unit 13 third heating unit 21a alternating-current power supplying unit 21 alternating-current power supply 22 direct-current power supply circuit 22a diode bridge 22b reactor 22c smoothing capacitor inverter circuit 23a, 23b IGBT 23c, 23d diode 24a, 24c, 24d resonant capacitor 25a input current detecting unit 25b, 25c, 25d coil current detecting unit 30a first transmitting and receiving unit 30b second transmitting and receiving unit 40 operation unit 40a to 40c operation unit 41 display unit 41a to 41c display unit 42 reporting unit 43 display and operation unit 45 control unit 50 drive circuit 50a to 50f drive circuit 60a magnetic member 60b cooking tray 61 upper heater 61a wire 62 temperature sensor 65 power receiving coil 70 food 80 stirring device 81 motor 82 shaft 83 blade unit 100 induction cooker 111a inner circumferential inner coil 111b outer circumferential left coil 111c outer circumferential upper coil 111d outer circumferential inner coil 112a inner circumferential outer coil 112b outer circumferential right coil 112c outer circumferential lower coil 112d outer circumferential outer coil 120 coil 200 cooking device 210 heating chamber 220 support unit 231a, 231b, 232a, 232b, 233a, 233b, 234a, 234b, 235a, 235b IGBT 231c, 231d, 232c, 232d, 233c, 233d, 234c, 234d, 235c, 235d diode

The invention claimed is:
1. A heating cooker system comprising:
    an induction cooker including
        a first coil configured to produce a first high-frequency magnetic field for induction heating,
        a first inverter circuit configured to supply a first high-frequency current to the first coil,
        a second coil configured to produce a second high-frequency magnetic field, and
        a second inverter circuit provided independently of the first inverter circuit and configured to supply a second high-frequency current to the second coil; and
    a cooking device including
        a power receiving coil configured to wirelessly receive supply of electric power from the second high-frequency magnetic field when the power receiving coil is positioned above the second coil and in the second high-frequency magnetic field, and
        a cooking unit configured to be driven by the electric power received by the power receiving coil,
        wherein the cooking unit is a stirring device configured to be driven to rotate by the electric power received by the power receiving coil, and stir a cooked food placed in a heating target positioned above the first coil, in the first high-frequency magnetic field, wherein the power receiving coil is located around the heating target, wherein the second coil is a power supply coil for performing wireless power transmission, wherein, in a plan view, the first coil and the second coil are located directly below a heating area on which the cooking device is disposed, wherein the first coil is an inner circumferential coil positioned at a center of the heating area, wherein the second coil is an outer circumferential coil positioned around the inner circumferential coil, wherein the cooked food is disposed on the center of the heating area and wherein the heating area, in the plan view, is defined by a substantially circular shape corresponding to a radially outermost periphery of the first coil and the second coil, and wherein the cooking device disposed on the heating area is heated by the first coil and wirelessly receives supply of the electric power from the second coil simultaneously, wherein the stirring device is disposed above the second coil and the heating target contains the cooked food.

2. The heating cooker system of claim 1, wherein the cooking device is detachably supported by the induction cooker.

3. The heating cooker system of claim 1, further comprising an alternating-current power supplying unit connected to an alternating-current power supply, wherein the first inverter circuit and the second inverter circuit are supplied with the alternating-current power supply via the alternating-current power supplying unit.

4. The heating cooker system of claim 3, wherein the alternating-current power supplying unit is a power supply plug connected to an outlet supplied with the alternating-current power supply.

5. The heating cooker system of claim 3, wherein the alternating-current power supplying unit is a connection terminal connected to a power supply cable supplied with the alternating-current power supply.

6. The heating cooker system of claim 1, further comprising a controller configured to control driving of the first inverter circuit in accordance with heating power for inductively heating a heating target positioned in the first high-frequency magnetic field, and control driving of the second inverter circuit in accordance with electric power to be transmitted to the power receiving coil.

7. The heating cooker system of claim 6, wherein the controller controls the driving of the second inverter circuit such that electric power to be received by the power receiving coil is equal to or less than 1500 W.

8. The heating cooker system of claim 6, wherein the controller controls the driving of the first inverter circuit such that electric power to be supplied to the first coil is equal to or less than 3000 W, and wherein the controller controls the driving of the second inverter circuit such that electric power to be received by the power receiving coil is equal to or less than 1500 W.

9. The heating cooker system of claim 1, wherein the first coil and the second coil are different in diameter and concentrically positioned.

10. The heating cooker system of claim 1, wherein the induction cooker includes a top plate on which the cooking device is placed, wherein the top plate has a first position mark representing a position at which a heating target is to be placed and a second position mark representing a position at which the power receiving coil is to be placed, and wherein the first coil is positioned under the first position mark on the top plate, and the second coil is positioned under the second position mark on the top plate.

11. The heating cooker system of claim 10, wherein the first coil includes one coil or a plurality of coils for the first position mark, and wherein the second coil includes one coil or a plurality of coils for the second position mark.

12. The heating cooker system of claim 1, wherein the heating target is a pot or a pan.

* * * * *